US010764730B2

(12) United States Patent
Bai

(10) Patent No.: US 10,764,730 B2
(45) Date of Patent: Sep. 1, 2020

(54) METHOD FOR EXCHANGING DATA WITH IN-VEHICLE INFOTAINMENT, SERVER, MOBILE TERMINAL, AND APPARATUS

(71) Applicant: Huawei Technologies Co., Ltd., Shenzhen, Guangdong (CN)

(72) Inventor: Chunrong Bai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 4 days.

(21) Appl. No.: 15/568,258

(22) PCT Filed: May 29, 2015

(86) PCT No.: PCT/CN2015/080365
§ 371 (c)(1),
(2) Date: Oct. 20, 2017

(87) PCT Pub. No.: WO2016/191961
PCT Pub. Date: Dec. 8, 2016

(65) Prior Publication Data
US 2018/0146356 A1 May 24, 2018

(51) Int. Cl.
*G06F 15/16* (2006.01)
*H04W 4/48* (2018.01)
(Continued)

(52) U.S. Cl.
CPC ............ *H04W 4/48* (2018.02); *G05B 19/418* (2013.01); *H04W 76/11* (2018.02); *H04W 4/024* (2018.02)

(58) Field of Classification Search
CPC . G06Q 30/0635; G06Q 30/0631; H04W 4/48; H04W 76/11; B60N 2/002;
(Continued)

(56) References Cited

U.S. PATENT DOCUMENTS 9,031,710 B2 5/2015 Barrett
9,654,937 B2 5/2017 Addepalli et al.
(Continued)

FOREIGN PATENT DOCUMENTS

CN 102063101 A 5/2011
CN 102843423 A 12/2012
(Continued)

OTHER PUBLICATIONS

J. Garthwaite, "GM's Volt to Launch With Cell Phone App for Remote Control"; https://gigaom.com; Jan. 6, 2010; 8 pages.

*Primary Examiner* — Hanh N Nguyen
(74) *Attorney, Agent, or Firm* — Slater Matsil, LLP

(57) ABSTRACT

The present invention discloses a method for exchanging data with an in-vehicle infotainment, a server, a mobile terminal, and an apparatus. The method includes: sending identification information of m online in-vehicle infotainments to a mobile terminal when login of the mobile terminal is detected, where the m online in-vehicle infotainments are bound to the mobile terminal, and m is an integer greater than or equal to 1; receiving a control command sent by the mobile terminal, where the control command is used to control k in-vehicle infotainments to execute an application, the k in-vehicle infotainments are corresponding k in-vehicle infotainments determined by the mobile terminal from the identification information of the m in-vehicle infotainments according to a received user operation, k is less than or equal to m, and k is an integer greater than or equal to 1; and sending the control command to the k in-vehicle infotainments.

9 Claims, 8 Drawing Sheets

(51) Int. Cl.
*G05B 19/418* (2006.01)
*H04W 76/11* (2018.01)
*H04W 4/024* (2018.01)

(58) Field of Classification Search
CPC .. B60Q 1/00; B60Q 9/00; B60K 35/00; G10L 25/63; G10L 15/22
See application file for complete search history.

(56) References Cited

U.S. PATENT DOCUMENTS

| | | | |
|---|---|---|---|
| 10,032,212 B2* | 7/2018 | Winkelman | G06Q 30/0635 |
| 10,140,645 B2* | 11/2018 | Driscoll | G06Q 30/0631 |
| 2002/0180579 A1 | 12/2002 | Nagaoka et al. | |
| 2010/0333146 A1* | 12/2010 | Pickney | B60R 11/0235 |
| | | | 725/75 |
| 2011/0316669 A1 | 12/2011 | McBride et al. | |
| 2013/0211623 A1 | 8/2013 | Thompson et al. | |
| 2015/0025704 A1 | 1/2015 | Horihata et al. | |
| 2015/0283503 A1 | 10/2015 | Chambron et al. | |
| 2016/0066013 A1* | 3/2016 | Li | H04N 21/2541 |
| | | | 725/75 |
| 2016/0129882 A1 | 5/2016 | Thompson et al. | |

FOREIGN PATENT DOCUMENTS

| | | |
|---|---|---|
| CN | 102923092 A | 2/2013 |
| CN | 103738265 A | 4/2014 |
| CN | 103738266 A | 4/2014 |
| CN | 103778688 A | 5/2014 |
| CN | 103780702 A | 5/2014 |
| CN | 103824342 A | 5/2014 |
| CN | 103905520 A | 7/2014 |
| CN | 203872252 U | 10/2014 |
| CN | 104158944 A | 11/2014 |
| CN | 104176045 A | 12/2014 |
| CN | 104320754 A | 1/2015 |
| CN | 104394190 A | 3/2015 |
| JP | 2012116395 | 6/2012 |
| JP | 2013192108 | 9/2013 |
| JP | 2013535121 A | 9/2013 |
| JP | 2014219366 A | 11/2014 |
| JP | 2015030381 A | 2/2015 |
| WO | 02/28083 A1 | 4/2002 |
| WO | 2011147893 A1 | 12/2011 |
| WO | 2014064350 A1 | 5/2014 |
| WO | 2014/092628 A1 | 6/2014 |

* cited by examiner

METHOD FOR EXCHANGING DATA WITH IN-VEHICLE INFOTAINMENT, SERVER, MOBILE TERMINAL, AND APPARATUS

CROSS REFERENCE TO RELATED APPLICATIONS

This application is a National Stage of International Patent Application No. PCT/CN2015/080365 filed May 29, 2015 which is incorporated herein by reference into the present disclosure as if fully set forth herein.

TECHNICAL FIELD

The present invention relates to the communications field, and in particular, to a method for exchanging data with an in-vehicle infotainment, a server, a mobile terminal, and an apparatus.

BACKGROUND

With gradual improvement of living standards of people and rapid development of economy, vehicles become more popular. It is predicted that in the near future, each family in China averagely has at least one vehicle. Moreover, as an important component of a vehicle, an in-vehicle infotainment not only provides a function of entertainment for a person in the vehicle, but also provides much convenience for vehicle driving.

The in-vehicle infotainment refers to a multimedia device that is installed on a center console of a vehicle by each vehicle manufacturer and that is used to play audio and video. People usually manually control the in-vehicle infotainment, and control a vehicle by using the in-vehicle infotainment. For example, people may manually enable a GPS (Global Positioning System, Global Positioning System) module on the in-vehicle infotainment of the vehicle, so that the GPS module displays map data on the in-vehicle infotainment in real time, so as to navigate the vehicle.

During implementation of the present invention, the inventor finds that the prior art has at least the following problems:

At present, a user manually controls an in-vehicle infotainment. When being in a vehicle, the user can control only an in-vehicle infotainment in this vehicle, and cannot find time to control an in-vehicle infotainment of another vehicle. This causes great inconvenience to use of the in-vehicle infotainment of the user. In addition, when a user is relatively far away from a vehicle, if the user intends to control an in-vehicle infotainment of the vehicle as soon as possible, the user has to run to and enter the vehicle as soon as possible, to control the in-vehicle infotainment. This still needs a period of time even if the user runs fast. A farther distance between the user and the vehicle indicates a longer needed time. Not only inconvenience is caused to the use of the in-vehicle infotainment of the user, but also a requirement on real-time performance of controlling the in-vehicle infotainment by the user cannot be satisfied.

SUMMARY

To resolve problems that at present, it is inconvenient for a user to use an in-vehicle infotainment and a requirement on real-time performance of controlling the in-vehicle infotainment by a user cannot be satisfied, embodiments of the present invention provide a method for exchanging data with an in-vehicle infotainment, a server, a mobile terminal, and an apparatus. The technical solutions are as follows:

According to a first aspect, an embodiment of the present invention provides a method for exchanging data with an in-vehicle infotainment, where the method is applied to a server, and includes:

sending identification information of m online in-vehicle infotainments to a mobile terminal when login of the mobile terminal is detected, where the m online in-vehicle infotainments are bound to the mobile terminal, and m is an integer greater than or equal to 1;

receiving a control command sent by the mobile terminal, where the control command is used to control k in-vehicle infotainments to execute an application, the k in-vehicle infotainments are corresponding k in-vehicle infotainments determined by the mobile terminal from the identification information of the m in-vehicle infotainments according to a received user operation, k is less than or equal to m, and k is an integer greater than or equal to 1; and sending the control command to the k in-vehicle infotainments.

With reference to the first aspect, in a first possible implementation manner of the first aspect, before the sending identification information of m online in-vehicle infotainments to a mobile terminal when login of the mobile terminal is detected, the method further includes:

receiving a binding instruction sent by the mobile terminal, where the binding instruction carries identification information of the mobile terminal and identification information of n in-vehicle infotainments, the binding instruction is used to instruct the server to bind the mobile terminal to the n in-vehicle infotainments, n is greater than or equal to m, and n is an integer greater than or equal to 1;

separately sending a binding acknowledgment request to the n in-vehicle infotainments according to the identification information of the n in-vehicle infotainments, where the binding acknowledgment requests are used to acknowledge whether the n in-vehicle infotainments are bound to the mobile terminal;

receiving binding acknowledgment responses sent by the n in-vehicle infotainments, where the binding acknowledgment responses sent by the n in-vehicle infotainments are responses for acknowledging, according to the binding acknowledgment requests, whether the n in-vehicle infotainments are bound to the mobile terminal; and binding the mobile terminal to the m in-vehicle infotainments according to the binding acknowledgment responses sent by the n in-vehicle infotainments, where the binding acknowledgment responses sent by the m in-vehicle infotainments are responses for acknowledging that them in-vehicle infotainments are bound to the mobile terminal.

With reference to the first aspect or the first possible implementation manner of the first aspect, in a second possible implementation manner of the first aspect, after the sending the control command to the k in-vehicle infotainments, the method further includes:

receiving execution result information sent after the k in-vehicle infotainments execute the control command; and sending the execution result information to the mobile terminal.

According to a second aspect, an embodiment of the present invention provides a method for exchanging data with an in-vehicle infotainment, where the method is applied to a mobile terminal, and includes:

logging in to a server;

receiving identification information of m in-vehicle infotainments that is sent by the server after the server is logged in to, where the m in-vehicle infotainments are bound to the mobile terminal, and m is an integer greater than or equal to 1; and receiving a user operation, where the user operation is used to determine corresponding k in-vehicle infotainments from the identification information of the m in-vehicle infotainments.

With reference to the second aspect, in a first possible implementation manner of the second aspect, before the logging in to a server, the method further includes:

sending a binding instruction to the server, where the binding instruction carries identification information of the mobile terminal and identification information of n in-vehicle infotainments, the binding instruction is used to instruct the server to bind the mobile terminal to the n in-vehicle infotainments, n is greater than or equal to m, and n is an integer greater than or equal to 1.

With reference to the first possible implementation manner of the second aspect, in a second possible implementation manner of the second aspect, the method further includes: receiving a binding completion notification sent by the server, where the binding completion notification is sent after the server binds the mobile terminal to the m in-vehicle infotainments.

With reference to the second aspect, the first possible implementation manner of the second aspect, or the second possible implementation manner of the second aspect, in a third possible implementation manner of the second aspect, the method further includes:

receiving execution result information that is sent by the server and that is sent after the k in-vehicle infotainments execute a control command.

According to a third aspect, an embodiment of the present invention provides a server, where the server includes a processor and a transceiver, where the transceiver is configured to: send identification information of m online in-vehicle infotainments to a mobile terminal when the processor detects the login of the mobile terminal, where the m online in-vehicle infotainments are bound to the mobile terminal, and m is an integer greater than or equal to 1; receive a control command sent by the mobile terminal, where the control command is used to control k in-vehicle infotainments to execute an application, the k in-vehicle infotainments are corresponding k in-vehicle infotainments determined by the mobile terminal from the identification information of the m in-vehicle infotainments according to a received user operation, k is less than or equal to m, and k is an integer greater than or equal to 1; and send the control command to the k in-vehicle infotainments; and the processor is configured to detect login of the mobile terminal.

With reference to the third aspect, in a first possible implementation manner of the third aspect, the transceiver is further configured to: receive a binding instruction sent by the mobile terminal, where the binding instruction carries identification information of the mobile terminal and identification information of n in-vehicle infotainments, the binding instruction is used to instruct the server to bind the mobile terminal to the n in-vehicle infotainments, n is greater than or equal to m, and n is an integer greater than or equal to 1; separately send a binding acknowledgment request to the n in-vehicle infotainments according to the identification information of the n in-vehicle infotainments, where the binding acknowledgment requests are used to acknowledge whether the n in-vehicle infotainments are bound to the mobile terminal; and receive binding acknowledgment responses sent by the n in-vehicle infotainments, where the binding acknowledgment responses sent by the n in-vehicle infotainments are responses for acknowledging, according to the binding acknowledgment requests, whether the n in-vehicle infotainments are bound to the mobile terminal; and the processor is further configured to bind the mobile terminal to the m in-vehicle infotainments according to the binding acknowledgment responses sent by the n in-vehicle infotainments, where the binding acknowledgment responses sent by the m in-vehicle infotainments are responses for acknowledging that them in-vehicle infotainments are bound to the mobile terminal.

With reference to the third aspect or the first possible implementation manner of the third aspect, in a second possible implementation manner of the third aspect, the transceiver is further configured to: receive execution result information sent after the k in-vehicle infotainments execute the control command; and send the execution result information to the mobile terminal.

According to a fourth aspect, an embodiment of the present invention provides a mobile terminal, where the mobile terminal includes a processor and a transceiver, where the processor is configured to log in to a server; and the transceiver is configured to: receive identification information of m in-vehicle infotainments that is sent by the server after the server is logged in to, where the m in-vehicle infotainments are bound to the mobile terminal, and m is an integer greater than or equal to 1; and receive a user operation, where the user operation is used to determine corresponding k in-vehicle infotainments from the identification information of the m in-vehicle infotainments.

With reference to the fourth aspect, in a first possible implementation manner of the fourth aspect, the transceiver is configured to send a binding instruction to the server, where the binding instruction carries identification information of the mobile terminal and identification information of n in-vehicle infotainments, the binding instruction is used to instruct the server to bind the mobile terminal to the n in-vehicle infotainments, n is greater than or equal to m, and n is an integer greater than or equal to 1.

With reference to the first possible implementation manner of the fourth aspect, in a second possible implementation manner of the fourth aspect, the transceiver is further configured to receive a binding completion notification sent by the server, where the binding completion notification is sent after the server binds the mobile terminal to the m in-vehicle infotainments.

With reference to the fourth aspect, the first possible implementation manner of the fourth aspect, or the second possible implementation manner of the fourth aspect, in a third possible implementation manner of the fourth aspect, the transceiver is further configured to receive execution result information that is sent by the server and that is sent after the k in-vehicle infotainments execute a control command.

According to a fifth aspect, an embodiment of the present invention provides an apparatus for exchanging data with an in-vehicle infotainment, where the apparatus includes:

a sending module, configured to send identification information of m online in-vehicle infotainments to a mobile terminal when login of the mobile terminal is detected, where the m online in-vehicle infotainments are bound to the mobile terminal, and m is an integer greater than or equal to 1; and a receiving module, configured to receive a control command sent by the mobile terminal, where the control command is used to control k in-vehicle infotainments to execute an application, the k in-vehicle infotainments are corresponding k in-vehicle infotainments determined by the mobile terminal from the identification information of the m in-vehicle infotainments according to a received user operation, k is less than or equal to m, and k is an integer greater than or equal to 1, where the sending module is further configured to send the control command to the k in-vehicle infotainments.

With reference to the fifth aspect, in a first possible implementation manner of the fifth aspect, the apparatus further includes a binding module;

the receiving module is further configured to receive a binding instruction sent by the mobile terminal, where the binding instruction carries identification information of the mobile terminal and identification information of n in-vehicle infotainments, the binding instruction is used to instruct the apparatus to bind the mobile terminal to the n in-vehicle infotainments, n is greater than or equal to m, and n is an integer greater than or equal to 1;

the sending module is further configured to separately send a binding acknowledgment request to the n in-vehicle infotainments according to the identification information of the n in-vehicle infotainments, where the binding acknowledgment requests are used to acknowledge whether the n in-vehicle infotainments are bound to the mobile terminal;

the receiving module is further configured to receive binding acknowledgment responses sent by the n in-vehicle infotainments, where the binding acknowledgment responses sent by the n in-vehicle infotainments are responses for acknowledging, according to the binding acknowledgment requests, whether the n in-vehicle infotainments are bound to the mobile terminal; and the binding module is configured to bind the mobile terminal to the m in-vehicle infotainments according to the binding acknowledgment responses sent by the n in-vehicle infotainments, where the binding acknowledgment responses sent by the m in-vehicle infotainments are responses for acknowledging that the m in-vehicle infotainments are bound to the mobile terminal.

With reference to the fifth aspect or the first possible implementation manner of the fifth aspect, in a second possible implementation manner of the fifth aspect, the receiving module is further configured to receive execution result information sent after the k in-vehicle infotainments execute the control command; and the sending module is further configured to send the execution result information to the mobile terminal.

According to a sixth aspect, an embodiment of the present invention provides an apparatus for exchanging data with an in-vehicle infotainment, where the apparatus includes:

a login module, configured to log in to a server; and a receiving module, configured to: receive identification information of m in-vehicle infotainments that is sent by the server after the server is logged in to, where the m in-vehicle infotainments are bound to the apparatus, and m is an integer greater than or equal to 1; and receive a user operation, where the user operation is used to determine corresponding k in-vehicle infotainments from the identification information of the m in-vehicle infotainments.

With reference to the sixth aspect, in a first possible implementation manner of the sixth aspect, the apparatus further includes:

a sending module, configured to send a binding instruction to the server, where the binding instruction carries identification information of the apparatus and identification information of n in-vehicle infotainments, the binding instruction is used to instruct the server to bind the apparatus to the n in-vehicle infotainments, n is greater than or equal to m, and n is an integer greater than or equal to 1.

With reference to the sixth aspect or the first possible implementation manner of the sixth aspect, in a second possible implementation manner of the sixth aspect, the receiving module is further configured to receive a binding completion notification sent by the server, where the binding completion notification is sent after the server binds the apparatus to the m in-vehicle infotainments.

With reference to the sixth aspect, the first possible implementation manner of the sixth aspect, or the second possible implementation manner of the sixth aspect, in a third possible implementation manner of the sixth aspect, the receiving module is further configured to receive execution result information that is sent by the server and that is sent after the k in-vehicle infotainments execute a control command.

In the embodiments of the present invention, when detecting login of a mobile terminal, a server sends identification information of m online in-vehicle infotainments to the mobile terminal. The m in-vehicle infotainments are bound to the mobile terminal. The mobile terminal receives the identification information of the m in-vehicle infotainments, further receives a user operation, determines k in-vehicle infotainments from the identification information of the m in-vehicle infotainments according to the user operation, and sends a control command to the server. The control command is used to control the k in-vehicle infotainments. The server sends the control command to the k in-vehicle infotainments. The mobile terminal can send the control command to the kin-vehicle infotainments by using the server. In this way, a user may control in-vehicle infotainments of one or more vehicles by using the mobile terminal. When controlling in-vehicle infotainments of multiple vehicles, the user does not need to separately run to and enter each vehicle to control the in-vehicle infotainment of each vehicle. This greatly facilitates use of the in-vehicle infotainment of the user. In addition, the mobile terminal sends the control command to the in-vehicle infotainment by using the server, so that the user can remotely control the in-vehicle infotainment by using the mobile terminal. In this way, even if the user is relatively far away from the vehicle, the user can still immediately control the in-vehicle infotainment of the vehicle by using the mobile terminal. This not only facilitates the use of the in-vehicle infotainment of the user, but also improves real-time performance of controlling the in-vehicle infotainment and satisfies a requirement on the real-time performance of controlling the in-vehicle infotainment by the user.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1-2 is a schematic diagram of a second network architecture for exchanging data with an in-vehicle infotainment according to another embodiment of the present invention;

FIG. 1-3 is a schematic structural diagram of a vehicle according to an embodiment of the present invention;

FIG. 2 is a schematic flowchart of a method for exchanging data with an in-vehicle infotainment according to another embodiment of the present invention;

FIG. 3 is a schematic flowchart of a method for exchanging data with an in-vehicle infotainment according to another embodiment of the present invention;

FIG. 4-1 is a schematic flowchart showing that a mobile terminal is bound to an in-vehicle infotainment according to an embodiment of the present invention;

FIG. 4-2 is a schematic diagram of a first interface according to an embodiment of the present invention;

FIG. 4-3 is a schematic diagram of a second interface according to another embodiment of the present invention;

FIG. 4-4 is a schematic flowchart of a method for exchanging data with an in-vehicle infotainment according to another embodiment of the present invention;

FIG. 4-5 is a schematic diagram of a third interface according to another embodiment of the present invention;

FIG. 4-6 is a schematic diagram of a fourth interface according to another embodiment of the present invention;

FIG. 5 is a schematic structural diagram of a server according to an embodiment of the present invention;

FIG. 6 is a schematic structural diagram of a mobile terminal according to an embodiment of the present invention;

DETAILED DESCRIPTION

To make the objectives, technical solutions, and advantages of the present invention clearer, the following further describes the embodiments of the present invention in detail with reference to the accompanying drawings.

Embodiment 1

Figure 1:
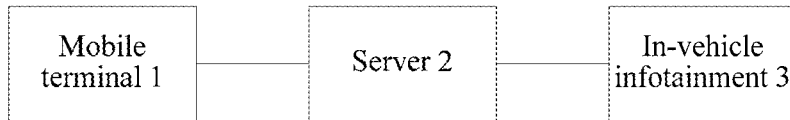
FIG. 1-1 is a schematic diagram of a first network architecture for exchanging data with an in-vehicle infotainment according to an embodiment of the present invention.

Referring to FIG. 1-1, this embodiment of the present invention provides a network architecture for exchanging data with an in-vehicle infotainment, including:

a mobile terminal 1, a server 2, and an in-vehicle infotainment 3, where the mobile terminal 1 and the server 2 may be connected to each other by using a communications network, the server 2 and the in-vehicle infotainment 3 may be connected to each other by using the communications network, and the communications network may be a mobile communications network or the like, for example, may be a mobile communications network such as a WiFi (Wireless Fidelity, Wireless Fidelity) network, a 3G network, or an LTE (Long Term Evolution, Long Term Evolution) network. The in-vehicle infotainment refers to a device installed on a center console of a vehicle and used for information exchange between a person and the vehicle.

The mobile terminal 1 may log in to the server 2 by using the communications network. When detecting the login of the mobile terminal 1, the server 2 sends, to the mobile terminal 1, identification information of m online in-vehicle infotainments that are bound to the mobile terminal 1, where m is an integer greater than or equal to 1. The mobile terminal 1 receives the identification information of the m online in-vehicle infotainments, receives a user operation, determines k in-vehicle infotainments from the identification information of the m online in-vehicle infotainments according to the user operation, and then sends a control command to the k in-vehicle infotainments by using the server 2, so as to control the k in-vehicle infotainments to execute the control command.

The server 2 stores a binding relationship list between the mobile terminal 1 and the in-vehicle infotainment 3. The binding relationship list includes identification information of the mobile terminal 1, and identification information and status information of the in-vehicle infotainment 3 that is bound to the mobile terminal 1. The status information includes being online or being offline. For each in-vehicle infotainment, when the in-vehicle infotainment is turned on, the in-vehicle infotainment notifies the server 2, and the server 2 changes the status information of the in-vehicle infotainment into being online in the binding relationship list. When the in-vehicle infotainment starts to be turned off, the in-vehicle infotainment also notifies the server 2, and the server 2 changes the status information of the in-vehicle infotainment into being offline in the binding relationship list. For example, refer to a binding information list shown in Table 1.

TABLE 1

| Identification information of mobile terminals | Identification information of in-vehicle infotainments | Status information |
| --- | --- | --- |
| ID1 | SD1 | Online |
| ID1 | SD2 | Online |
| ID1 | SID3 | Online |
| ... | ... | ... |

After the mobile terminal 1 logs into the server 2, the server 2 may obtain the identification information of the mobile terminal 1, and obtain, from the binding information list shown in Table 1 according to the identification information of the mobile terminal 1, the identification information of the m online in-vehicle infotainments that are bound to the mobile terminal 1.

Further, before the mobile terminal 1 controls the in-vehicle infotainment, the server 2 needs to bind the mobile terminal 1 to the in-vehicle infotainment 3. A specific process is as follows:

The mobile terminal 1 obtains identification information of n in-vehicle infotainments 3 that need to be bound to the mobile terminal 1. For example, the mobile terminal 1 may receive the identification information, which is entered by a user, of the n in-vehicle infotainments 3 that need to be bound to the mobile terminal 1, where n is an integer greater than or equal to m, and send a binding instruction to the server 2. The binding instruction carries the identification information of the mobile terminal 1 and the identification information of the n in-vehicle infotainments 3. The server 2 separately sends a binding acknowledgment request to the n in-vehicle infotainments 3 according to the identification information of the n in-vehicle infotainments 3. The n in-vehicle infotainments 3 receive the binding acknowledgment request, acknowledge, according to the binding acknowledgment requests, whether to be bound to the mobile terminal 1, and send binding acknowledgment responses to the server 2. The binding acknowledgment responses are used to represent an acknowledgment result of the in-vehicle infotainment 3. The server 2 receives the binding acknowledgment responses sent by the n in-vehicle infotainments 3, and binds the mobile terminal 1 to the m in-vehicle infotainments according to the binding acknowledgment responses sent by the n in-vehicle infotainments 3. The binding acknowledgment responses sent by the m in-vehicle infotainments 3 are responses for acknowledging that the m in-vehicle infotainments 3 are bound to the mobile terminal 1.

For example, assuming that n is 4, m is 3, and k is 2, the mobile terminal 1 obtains identification information of four in-vehicle infotainments that need to be bound to the mobile terminal 1, namely, identification information SID1 of an in-vehicle infotainment 1, identification information SID2 of an in-vehicle infotainment 2, identification information SID3 of an in-vehicle infotainment 3, and identification information SID4 of an in-vehicle infotainment 4. The mobile terminal 1 sends a binding instruction to the server 2. The binding instruction carries the identification information SID1 of the in-vehicle infotainment 1, the identification information SID2 of the in-vehicle infotainment 2, the identification information SID3 of the in-vehicle infotainment 3, and the identification information SID4 of the in-vehicle infotainment 4. The server receives the binding instruction, and separately sends a binding acknowledgment request to the in-vehicle infotainment 1, the in-vehicle infotainment 2, the in-vehicle infotainment 3, and the in-vehicle infotainment 4 according to the identification information SID1 of the in-vehicle infotainment 1, the identification information SID2 of the in-vehicle infotainment 2, the identification information SID3 of the in-vehicle infotainment 3, and the identification information SID4 of the in-vehicle infotainment 4 that are carried in the binding instruction. The in-vehicle infotainment 1, the in-vehicle infotainment 2, the in-vehicle infotainment 3, and the in-vehicle infotainment 4 separately receive the binding acknowledgment request, acknowledge, according to the binding acknowledgment requests, whether to be bound to the mobile terminal 1, and then send binding acknowledgment responses to the server 2. It is assumed that the in-vehicle infotainment 1, the in-vehicle infotainment 2, and the in-vehicle infotainment 3 are acknowledged to be bound to the mobile terminal 1, and the in-vehicle infotainment 4 is acknowledged to be not bound to the mobile terminal 1. The server 2 receives the binding acknowledgment responses sent by the in-vehicle infotainment 1, the in-vehicle infotainment 2, the in-vehicle infotainment 3, and the in-vehicle infotainment 4, determines, according to the binding acknowledgment responses sent by the in-vehicle infotainment 1, the in-vehicle infotainment 2, the in-vehicle infotainment 3, and the in-vehicle infotainment 4, that the in-vehicle infotainment 1, the in-vehicle infotainment 2, and the in-vehicle infotainment 3 are acknowledged to be bound to the mobile terminal 1, and separately binds the mobile terminal 1 to the in-vehicle infotainment 1, the in-vehicle infotainment 2, and the in-vehicle infotainment 3.

When an in-vehicle infotainment needs to be controlled by using the mobile terminal 1, the mobile terminal 1 logs in to the server 2. When detecting the login of the mobile terminal 1, the server 2 sends, to the mobile terminal 1, the identification information SID1 of the in-vehicle infotainment 1, the identification information SID2 of the in-vehicle infotainment 2, and the identification information SID3 of the in-vehicle infotainment 3 that are bound to the mobile terminal 1 and that are online. The mobile terminal 1 receives the identification information SID1 of the in-vehicle infotainment 1, the identification information SID2 of the in-vehicle infotainment 2, and the identification information SID3 of the in-vehicle infotainment 3, receives a user operation, determines two in-vehicle infotainments, which are assumed to be the in-vehicle infotainment 1 and the in-vehicle infotainment 2, from the identification information SID1 of the in-vehicle infotainment 1, the identification information SID2 of the in-vehicle infotainment 2, and the identification information SID3 of the in-vehicle infotainment 3 according to the user operation, then sends the control command to the in-vehicle infotainment 1 and the in-vehicle infotainment 2 by using the server 2, and controls the in-vehicle infotainment 1 and the in-vehicle infotainment 2 to execute the control command.

Figures 1, 2:

Referring to FIG. 1-2, the network architecture further includes a gateway 4. The gateway 4 may be integrated in the server and is a functional module in the server, or may be a device separated from the server, and the gateway 4 and the server are connected to each other by using the communications network. The server sends the binding acknowledgment request to the in-vehicle infotainment 3 by using the gateway 4. Optionally, the binding acknowledgment request may be an SMS message or the like, and the gateway 4 may be an SMS gateway.

The identification information of the mobile terminal 1 may be used to identify a phone number of the mobile terminal 1 and the like. The identification information of the in-vehicle infotainment 3 may be used to identify a phone number of the in-vehicle infotainment 3 and the like.

Further, after executing the control command, the k in-vehicle infotainments may further obtain execution result information, and send the execution result information to the server 2. The server 2 receives the execution result information sent by the k in-vehicle infotainments 3, and sends the execution result information of the k in-vehicle infotainments 3 to the mobile terminal 1. The mobile terminal 1 receives the execution result information of the k in-vehicle infotainments 3, and displays the execution result information of the k in-vehicle infotainments 3.

Figures 1, 2, 3:
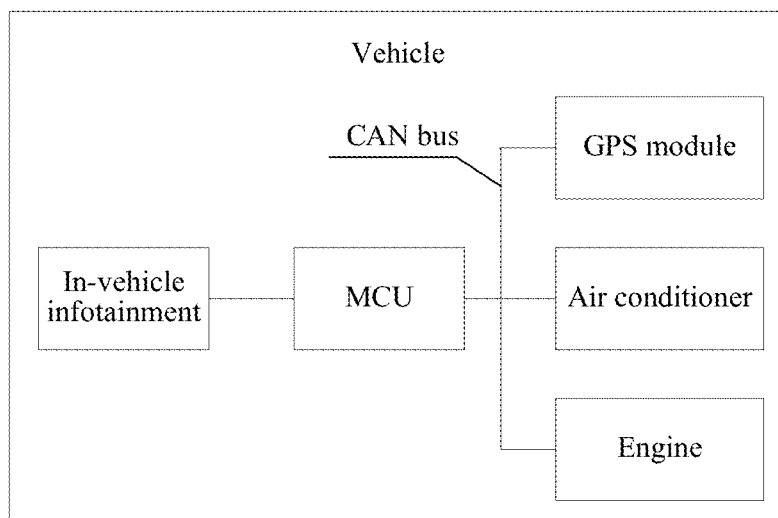
Figure 2:
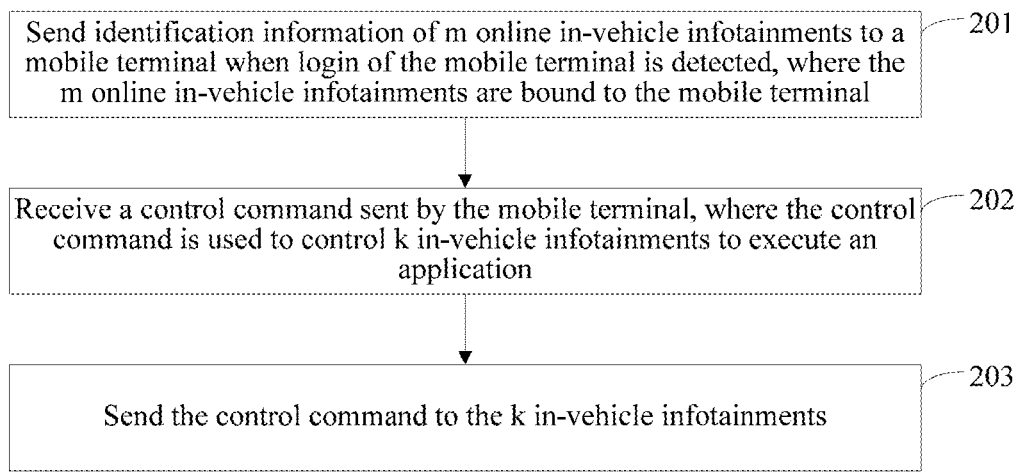
Figure 3:
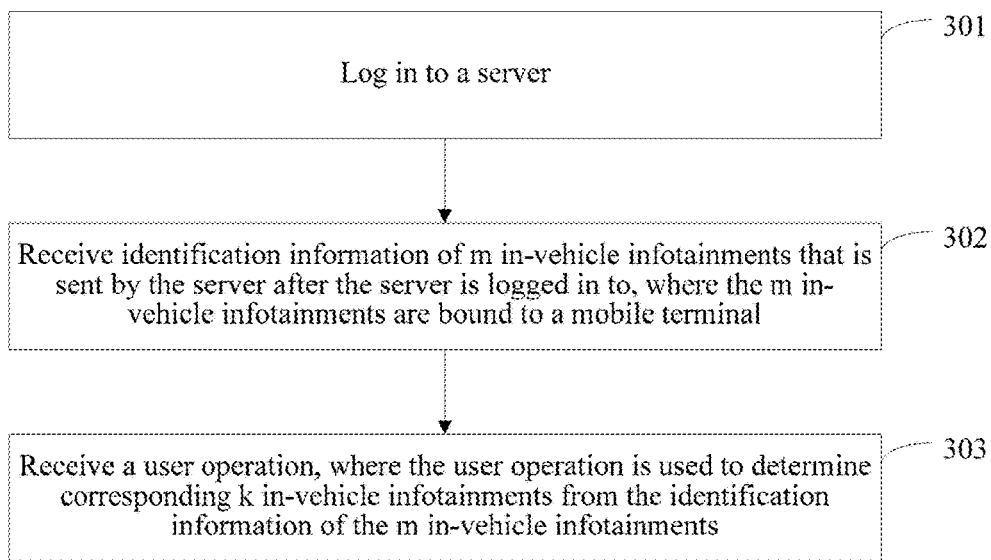

Referring to FIG. 1-3, for each in-vehicle infotainment 3, the in-vehicle infotainment 3 is installed on a center console of a vehicle. The in-vehicle infotainment 3 is connected to an MCU (microcontroller unit, microcontroller unit) of the vehicle, and the MCU is connected to components in the vehicle by using a CAN (controller area network, controller area network) bus. For example, the MCU may be connected to an engine, an air conditioner, a GPS module, and the like in the vehicle by using the CAN bus.

Correspondingly, for each of the k in-vehicle infotainments 3, the execution of the control command by the in-vehicle infotainment may be: the in-vehicle infotainment sends the control command to an MCU in a vehicle in which the in-vehicle infotainment is located, the MCU of the vehicle in which the in-vehicle infotainment is located executes the control command, to obtain execution result information, and sends the execution result information to the in-vehicle infotainment.

For example, the control command may be a location query command used to query a current location of a vehicle, a status query command used to query a status of a vehicle, an engine query command used to query a status of an engine, or the like. When the control command is a location query command, the in-vehicle infotainment sends the location query command to an MCU of a vehicle in which the in-vehicle infotainment is located. The MCU invokes a GPS module to obtain location information of the vehicle. The location information is execution result information, and sends the execution result information to the vehicle. When the control command is a status query command, the in-vehicle infotainment sends the status query command to an MCU of a vehicle in which the in-vehicle infotainment is located. The MCU obtains a current status of the vehicle. The current status is execution result information, and sends the execution result information to the vehicle. When the control command is an engine query command, the in-vehicle infotainment sends the engine query command to an MCU of a vehicle in which the in-vehicle infotainment is located. The MCU obtains a current status of an engine of the vehicle. The current status of the engine is execution result information, and sends the execution result information to the in-vehicle infotainment.

Embodiment 2

Referring to FIG. 2, this embodiment of the present invention provides a method for exchanging data with an in-vehicle infotainment, which may be applied to a server and includes:

Step 201: Send identification information of m online in-vehicle infotainments to a mobile terminal when login of the mobile terminal is detected, where the m online in-vehicle infotainments are bound to the mobile terminal, and m is an integer greater than or equal to 1.

Step 202: Receive a control command sent by the mobile terminal, where the control command is used to control k in-vehicle infotainments to execute an application, the k in-vehicle infotainments are corresponding k in-vehicle infotainments determined by the mobile terminal from the identification information of the m in-vehicle infotainments according to a received user operation, k is less than or equal to m, and k is an integer greater than or equal to 1.

Step 203: Send the control command to the k in-vehicle infotainments.

In this embodiment of the present invention, identification information of m in-vehicle infotainments bounded to a mobile terminal is sent to the mobile terminal when login of the mobile terminal is detected, so that the mobile terminal determines k in-vehicle infotainments from the identification information of the m in-vehicle infotainments according to a user operation, receives a control command sent by the mobile terminal, and sends the control command to the k in-vehicle infotainments. A server can send the control command to the k in-vehicle infotainments. In this way, a user may control in-vehicle infotainments of one or more vehicles by using the mobile terminal. When controlling in-vehicle infotainments of multiple vehicles, the user does not need to separately run to and enter each vehicle to control the in-vehicle infotainment of each vehicle. This greatly facilitates use of the in-vehicle infotainment of the user. In addition, the mobile terminal sends the control command to the in-vehicle infotainment by using the server, so that the user can remotely control the in-vehicle infotainment by using the mobile terminal. In this way, even if the user is relatively far away from the vehicle, the user can still immediately control the in-vehicle infotainment of the vehicle by using the mobile terminal. This not only facilitates the use of the in-vehicle infotainment of the user, but also improves real-time performance of controlling the in-vehicle infotainment and satisfies a requirement on the real-time performance of controlling the in-vehicle infotainment by the user.

Embodiment 3

Referring to the FIG. 3, this embodiment of the present invention provides a method for exchanging data with an in-vehicle infotainment, which is applied to a mobile terminal and includes:

Step 301: Log in to a server.

Step 302: Receive identification information of m in-vehicle infotainments that is sent by the server after the server is logged in to, where the m in-vehicle infotainments are bound to a mobile terminal, and m is an integer greater than or equal to 1.

Step 303: Receive a user operation, where the user operation is used to determine corresponding k in-vehicle infotainments from the identification information of the m in-vehicle infotainments.

Optionally, a process in which the mobile terminal logs in to the server may be:

The mobile terminal may display a login interface. A user may enter identification information of the mobile terminal and a login password into the login interface. For example, if the identification information of the mobile terminal is a phone number, the user may enter the phone number of the mobile terminal and the login password into the login interface. The mobile terminal obtains the identification information of the mobile terminal and the login password from the login interface, and sends a login request to the server. The login request carries the identification information of the mobile terminal and the login password. The server receives the login request, and finds, according to the identification information of the mobile terminal carried in the login request, a corresponding login password from a correspondence that is between identification information and login passwords and that is stored in the server. If the found login password is the same as the login password carried in the login request, the mobile terminal is allowed to log in. The identification information and the login passwords in the correspondence between the identification information and the login passwords are all registered in the server by the user in advance.

In this embodiment of the present invention, when an in-vehicle infotainment needs to be controlled, a mobile terminal logs in to a server, receives identification information, which is sent by the server, of m in-vehicle infotainments bound to the mobile terminal, receives a user operation, and determines k in-vehicle infotainments from the identification information of the m in-vehicle infotainments according to the user operation. After the mobile terminal determines the k in-vehicle infotainments, a user may send a control command to the k in-vehicle infotainments by using the mobile terminal. In this way, the user may control in-vehicle infotainments of one or more vehicles by using the mobile terminal. When controlling in-vehicle infotainments of multiple vehicles, the user does not need to separately run to and enter each vehicle to control the in-vehicle infotainment of each vehicle. This greatly facilitates use of the in-vehicle infotainment of the user. In addition, the in-vehicle infotainment is remotely controlled by using the mobile terminal. In this way, even if the user is relatively far away from the vehicle, the user can still immediately control the in-vehicle infotainment of the vehicle by using the mobile terminal. This not only facilitates the use of the in-vehicle infotainment of the user, but also improves real-time performance of controlling the in-vehicle infotainment and satisfies a requirement on the real-time performance of controlling the in-vehicle infotainment by the user.

Embodiment 4

This embodiment of the present invention provides a method for exchanging data with an in-vehicle infotainment. The method includes two processes. A first process is binding a mobile terminal to an in-vehicle infotainment, and a second process is controlling, by using the mobile terminal, the in-vehicle infotainment to execute a control command. First, referring to FIG. 4-1, a process of binding the mobile terminal to the in-vehicle infotainment includes:

Step 401: The mobile terminal logs in to a server, and sends a binding instruction to the server after the login, where the binding instruction carries identification information of the mobile terminal and identification information of n in-vehicle infotainments, n is an integer greater than or equal to 1, and the binding instruction is used to instruct the server to bind the mobile terminal to the n in-vehicle infotainments.

The mobile terminal may display a login interface. A user may enter the identification information of the mobile terminal and a login password into the login interface. For example, if the identification information of the mobile terminal is a phone number, the user may enter the phone number of the mobile terminal and the login password into the login interface. The mobile terminal obtains the identification information of the mobile terminal and the login password from the login interface, and sends a login request to the server. The login request carries the identification information of the mobile terminal and the login password. The server receives the login request, and finds, according to the identification information of the mobile terminal carried in the login request, a corresponding login password from a correspondence that is between identification information and login passwords and that is stored in the server. If the found login password is the same as the login password carried in the login request, the mobile terminal is allowed to log in. The identification information and the login passwords in the correspondence between the identification information and the login passwords are all registered in the server by the user in advance.

After logging in, the mobile terminal may display a binding interface. The user may enter, into the binding interface, the identification information of the n in-vehicle infotainments that need to be bound to the mobile terminal. For example, the mobile terminal displays the binding interface shown in FIG. 4-2. The user may enter, into an input box, the identification information of the n in-vehicle infotainments that need to be bound to the mobile terminal, and then clicks a binding button, to submit a binding command to the mobile terminal. After detecting the binding command, the mobile terminal extracts, from the binding interface, the identification information of the n in-vehicle infotainments that is entered by the user.

Figures 1, 4:
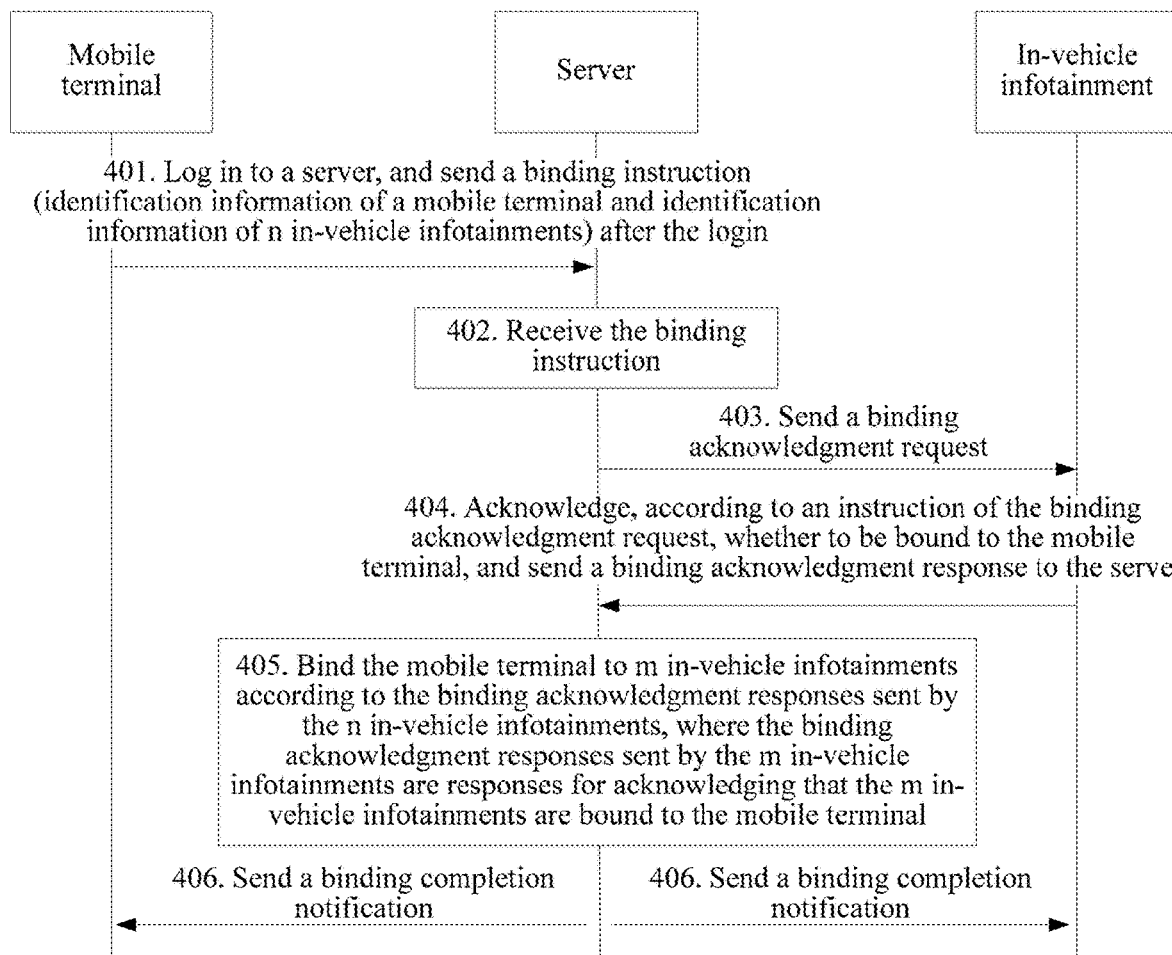
Figures 2, 4:
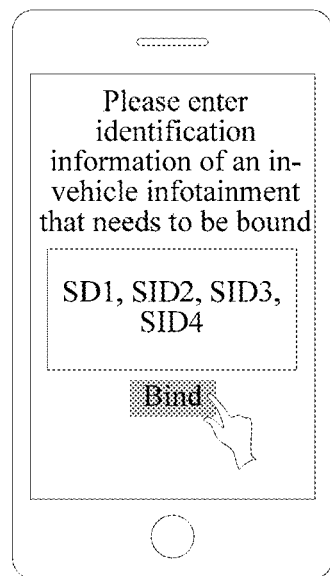
Figures 3, 4:
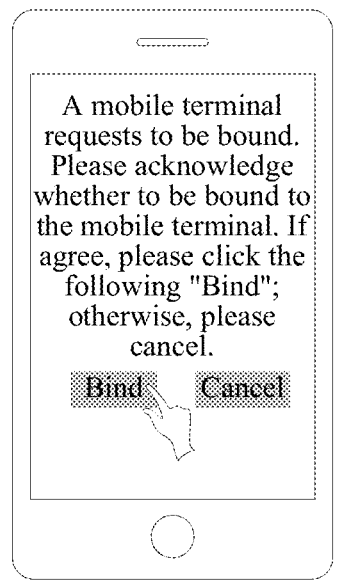
Figure 4:
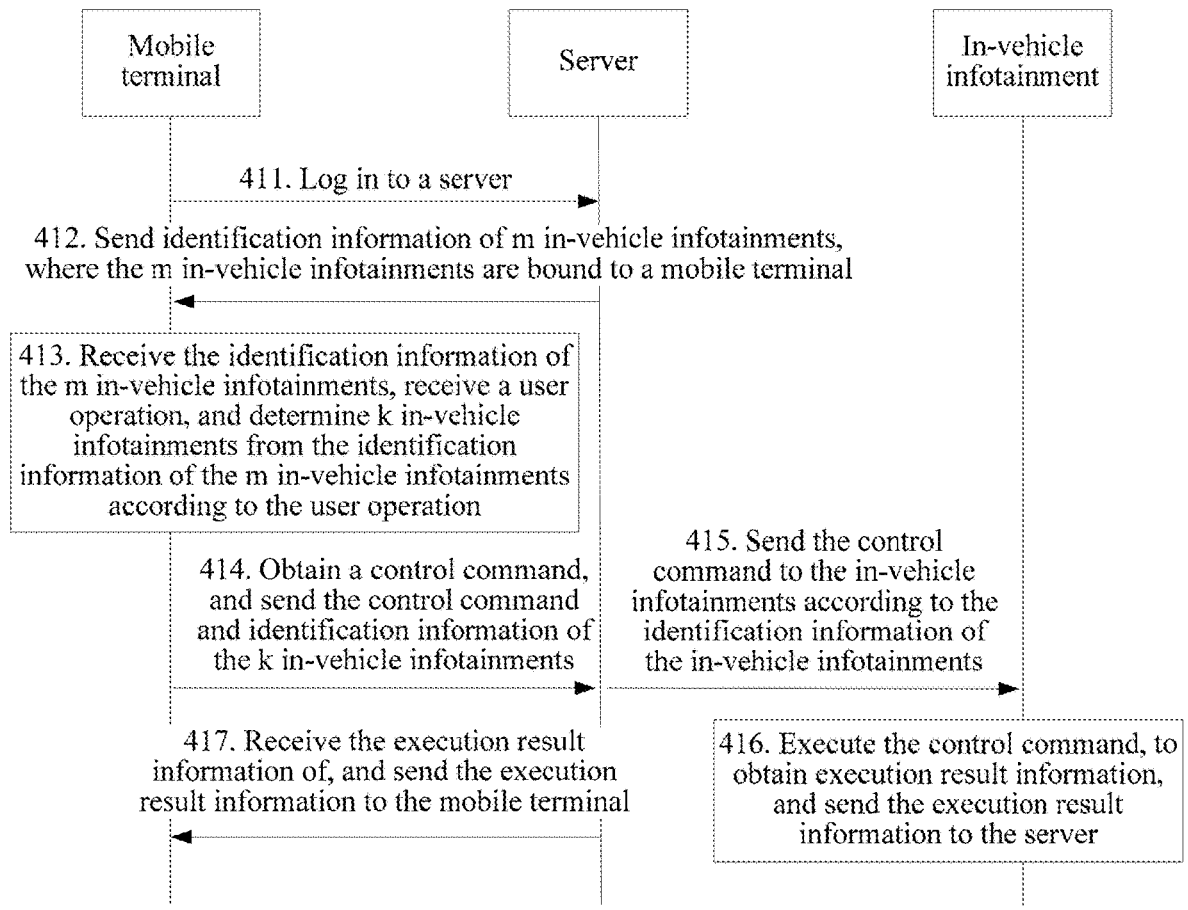

For example, the user enters identification information SID1 of an in-vehicle infotainment 1, identification information SID2 of an in-vehicle infotainment 2, identification information SID3 of an in-vehicle infotainment 3, and identification information SID4 of an in-vehicle infotainment 4 into the binding interface shown in FIG. 4-2, that is, n is 4, and then clicks the binding button, to submit the binding command. After detecting the binding command, the mobile terminal extracts, from the binding interface shown in FIG. 4-2, the identification information of four in-vehicle infotainments that is entered by the user, namely, the identification information SID1 of the in-vehicle infotainment 1, the identification information SID2 of the in-vehicle infotainment 2, the identification information SID3 of the in-vehicle infotainment 3, and the identification information SID4 of the in-vehicle infotainment 4; and sends the binding instruction to the server, where the binding instruction carries the identification information SID1 of the in-vehicle infotainment 1, the identification information SID2 of the in-vehicle infotainment 2, the identification information SID3 of the in-vehicle infotainment 3, and the identification information SID4 of the in-vehicle infotainment 4.

Step 402: The server receives the binding instruction, where the binding instruction carries the identification information of the mobile terminal and the identification information of the n in-vehicle infotainments.

Step 403: The server separately sends a binding acknowledgment request to the n in-vehicle infotainments according to the identification information of the n in-vehicle infotainments.

The server may send the binding acknowledgment request to the n in-vehicle infotainments by using a gateway. The binding acknowledgment request may be an SMS message, and the gateway may be an SMS gateway.

For example, the server receives the binding instruction, and separately sends a binding acknowledgment request to the in-vehicle infotainment 1, the in-vehicle infotainment 2, the in-vehicle infotainment 3, and the in-vehicle infotainment 4 according to the identification information SID1 of the in-vehicle infotainment 1, the identification information SID2 of the in-vehicle infotainment 2, the identification information SID3 of the in-vehicle infotainment 3, and the identification information SID4 of the in-vehicle infotainment 4 that are carried in the binding instruction.

For each of the n in-vehicle infotainments, when the in-vehicle infotainment receives the binding acknowledgment request sent by the server, the following operations start to be executed.

Step 404: An in-vehicle infotainment receives the binding acknowledgment request, acknowledges, according to an instruction of the binding acknowledgment request, whether to be bound to the mobile terminal, and sends a binding acknowledgment response to the server.

Specifically, the in-vehicle infotainment receives the binding acknowledgment request, displays a binding acknowledgment interface according to an instruction of the binding acknowledgment request. The binding acknowledgment interface includes a binding button, a cancellation button, prompt information used to prompt the user whether to bind the mobile terminal to the in-vehicle infotainment, and the like, for example, referring to the binding acknowledgment interface shown in FIG. 4-3. If the user determines to bind the mobile terminal to the in-vehicle infotainment, the user may click the binding button, to submit a binding command to the in-vehicle infotainment. If the user determines not to bind the mobile terminal to the in-vehicle infotainment, the user may click the cancellation button, to submit a cancellation command to the in-vehicle infotainment. The in-vehicle infotainment detects a command generated when a user clicks a button. If the command detected by the in-vehicle infotainment is the binding command, the in-vehicle infotainment determines to be bound to the mobile terminal. If the command detected by the in-vehicle infotainment is the cancellation command, the in-vehicle infotainment determines not to be bound to the mobile terminal. Then, the in-vehicle infotainment sends the binding acknowledgment response to the server. The in-vehicle infotainment may send the binding acknowledgment response to the server by using the gateway. The binding acknowledgment response may be an SMS message.

For each of the n in-vehicle infotainments, step 404 is performed. That is, the n in-vehicle infotainments separately acknowledge, according to the instruction of the binding acknowledgment request, whether to be bound to the mobile terminal, and send binding acknowledgment responses to the server.

For example, the in-vehicle infotainment 1, the in-vehicle infotainment 2, the in-vehicle infotainment 3, and the in-vehicle infotainment 4 separately receive the binding acknowledgment request sent by the server, and then display the binding acknowledgment interface to the user, to let the user acknowledge whether to be bound to the mobile terminal. It is assumed that the user acknowledges that the in-vehicle infotainment 1, the in-vehicle infotainment 2, and the in-vehicle infotainment 3 are bound to the mobile terminal, and acknowledges that the in-vehicle infotainment 4 is not bound to the mobile terminal; and then the in-vehicle infotainment 1, the in-vehicle infotainment 2, the in-vehicle infotainment 3, and the in-vehicle infotainment 4 respectively send the binding acknowledgment responses to the server.

Step 405: The server receives the binding acknowledgment responses sent by the n in-vehicle infotainments, and binds the mobile terminal to m in-vehicle infotainments according to the binding acknowledgment responses sent by the n in-vehicle infotainments, where the binding acknowledgment responses sent by the m in-vehicle infotainments are responses for acknowledging that them in-vehicle infotainments are bound to the mobile terminal.

For each of the n in-vehicle infotainments, the binding acknowledgment response of the in-vehicle infotainment is used to indicate whether the in-vehicle infotainment is bound to the mobile terminal. Therefore, the server selects, from the binding acknowledgment responses sent by the n in-vehicle infotainments, m binding acknowledgment responses used to indicate that m in-vehicle infotainments are bounded to the mobile terminal, determines the m in-vehicle infotainments corresponding to the m binding acknowledgment responses, and then binds the mobile terminal to the m in-vehicle infotainments.

For example, the server receives the binding acknowledgment responses respectively sent by the in-vehicle infotainment 1, the in-vehicle infotainment 2, the in-vehicle infotainment 3, and the in-vehicle infotainment 4, determines, according to the binding acknowledgment responses sent by the in-vehicle infotainment 1, the in-vehicle infotainment 2, the in-vehicle infotainment 3, and the in-vehicle infotainment 4, that the in-vehicle infotainment 1, the in-vehicle infotainment 2, and the in-vehicle infotainment 3 are all acknowledged to be bound to the mobile terminal, and binds the mobile terminal to the in-vehicle infotainment 1, the in-vehicle infotainment 2, and the in-vehicle infotainment 3.

The server stores a correspondence between the identification information of the mobile terminal and the identification information of each of the m in-vehicle infotainments in a binding relationship list, to bind the mobile terminal to the m in-vehicle infotainments. The binding relationship list further stores status information of each in-vehicle infotainment. For any in-vehicle infotainment, when the in-vehicle infotainment is turned on, the in-vehicle infotainment notifies the server, and the server changes the status information of the in-vehicle infotainment into being online in the binding relationship list. When the in-vehicle infotainment starts to be turned off, the in-vehicle infotainment also notifies the server, and the server changes the status information of the in-vehicle infotainment into being offline in the binding relationship list.

Step 406: After binding the mobile terminal to them in-vehicle infotainments, the server separately sends a binding completion notification to the mobile terminal and the m in-vehicle infotainments.

The mobile terminal and them in-vehicle infotainments receive the binding completion notification, and separately display the binding completion notification to the user.

Further, after binding the mobile terminal to the m in-vehicle infotainments, the server may further generate an asymmetrical cipher key for each of the m in-vehicle infotainments. The asymmetrical cipher key of the in-vehicle infotainment includes a public key and a private key. The binding completion notification sent by the server to the in-vehicle infotainment may carry the private key and the server stores the public key of the in-vehicle infotainment. Correspondingly, after receiving the binding completion notification, the in-vehicle infotainment stores the private key carried in the binding completion notification.

After the mobile terminal is bound to the in-vehicle infotainment, the in-vehicle infotainment may be controlled, by using the mobile terminal, to execute the control command. Referring to FIG. 4-4, the process includes:

Step 411: The mobile terminal logs in to the server.

The mobile terminal may display a login interface. The user may enter the identification information of the mobile terminal and a login password into the login interface. For example, if the identification information of the mobile terminal is a phone number, the user may enter the phone number of the mobile terminal and the login password into the login interface. The mobile terminal obtains the identification information of the mobile terminal and the login password from the login interface, and sends a login request to the server. The login request carries the identification information of the mobile terminal and the login password. The server receives the login request, and finds, according to the identification information of the mobile terminal carried in the login request, a corresponding login password from a correspondence that is between identification information and login passwords and that is stored in the server. If the found login password is the same as the login password carried in the login request, the mobile terminal is allowed to log in.

Step 412: After detecting the login of the mobile terminal, the server sends the identification information of the m online in-vehicle infotainments to the mobile terminal, where the m online in-vehicle infotainments are bound to the mobile terminal, m is an integer greater than or equal to 1, and m is less than or equal to n.

The login request sent by the mobile terminal carries the identification information of the mobile terminal. Therefore, the server may obtain the identification information of the mobile terminal from the login request. Correspondingly, this step may be: obtaining, from the binding relationship list according to the identification information of the mobile terminal, the identification information of the m in-vehicle infotainments whose corresponding status information is being online, and sending the identification information of the m online in-vehicle infotainments to the mobile terminal.

For example, the server obtains, from the binding relationship list shown in Table 1 according to the identification information ID1 of the mobile terminal, identification information of three in-vehicle infotainments whose status information is being online, that is, m is 3, namely, the identification information SID1 of the in-vehicle infotainment 1, the identification information SID2 of the in-vehicle infotainment 2, and the identification information SID3 of the in-vehicle infotainment 3, and sends the identification information SID1 of the in-vehicle infotainment 1, the identification information SID2 of the in-vehicle infotainment 2, and the identification information SID3 of the in-vehicle infotainment 3 to the mobile terminal.

Further, the server further obtains a public key corresponding to each of the m in-vehicle infotainments, and sends the public key corresponding to each in-vehicle infotainment to the mobile terminal.

Step 413: The mobile terminal receives the identification information of the m in-vehicle infotainments, receives a user operation, and determines corresponding k in-vehicle infotainments from the identification information of the m in-vehicle infotainments according to the user operation.

In this step, the operation for determining the k in-vehicle infotainments may be: receiving, by the mobile terminal, the identification information of the m in-vehicle infotainments, displaying, in a display interface, in-vehicle infotainment names corresponding to the identification information of the m in-vehicle infotainments, selecting, by the user from the displayed in-vehicle infotainment names of the m in-vehicle infotainments, in-vehicle infotainment names of the k in-vehicle infotainments that need to be controlled, and obtaining, by the mobile terminal, the k in-vehicle infotainments selected by the user.

For example, the mobile terminal receives the identification information SID1 of the in-vehicle infotainment 1, the identification information SID2 of the in-vehicle infotainment 2, and the identification information SID3 of the in-vehicle infotainment 3. Referring to a display interface shown in FIG. 4-5, the mobile terminal displays, in the display interface, in-vehicle infotainment names respectively corresponding to the identification information SID1 of the in-vehicle infotainment 1, the identification information SID2 of the in-vehicle infotainment 2, and the identification information SID3 of the in-vehicle infotainment 3, namely, name1, name2, and name3. An in-vehicle infotainment name of each in-vehicle infotainment further corresponds to a selection button. If a user intends to select an in-vehicle infotainment name, the user may click a selection button corresponding to the in-vehicle infotainment name. For example, the user separately clicks selection buttons corresponding to the in-vehicle infotainment names name1 and name2. In addition, the display interface further includes a submit button. The user may click the submit button after selection, to trigger the mobile terminal, and then the mobile terminal obtains two selected in-vehicle infotainments, namely, the in-vehicle infotainment 1 and the in-vehicle infotainment 2, that is, k is 2.

In addition, the k in-vehicle infotainments may be further determined in another manner. For example, it is assumed that a default setting of the mobile terminal is to select, by default, an in-vehicle infotainment corresponding to a first in-vehicle infotainment name that is displayed. If the in-vehicle infotainment corresponding to the first in-vehicle infotainment name displayed in the display interface is exactly what the user intends to select, the user may directly click the submit button, to trigger the mobile terminal, and then the mobile terminal selects, according to the default setting, the in-vehicle infotainment corresponding to the first in-vehicle infotainment name.

Step 414: The mobile terminal obtains a control command, and sends the control command and identification information of the k in-vehicle infotainments to the server.

The mobile terminal may display a control interface including the control command for the user to select the control command. For example, referring to a control interface shown in FIG. 4-5, the control interface includes a location query command used to query a current location of a vehicle, a status query command used to query a status of a vehicle, an engine query command used to query a status of an engine, or the like. The user may click a control command. The mobile terminal obtains the control command selected by the user, and sends the control command and the identification information of the k in-vehicle infotainments to the server.

For example, assuming that the control command clicked by the user is a location query command, the mobile terminal sends the identification information SID1 of the in-vehicle infotainment 1, the identification information SID2 of the in-vehicle infotainment 2, and the location query command to the server.

Further, before sending the control command, the mobile terminal may further encrypt the control command by using a public key of an in-vehicle infotainment, and send the encrypted control command to the server.

Step 415: The server receives the identification information of the k in-vehicle infotainments and the control command, and separately sends the control command to the k in-vehicle infotainments according to the identification information of the k in-vehicle infotainments.

For example, the server receives the identification information SID1 of the in-vehicle infotainment 1, the identification information SID2 of the in-vehicle infotainment 2, and the location query command, and separately sends the location query command to the in-vehicle infotainment 1 and the in-vehicle infotainment 2 according to the identification information SID1 of the in-vehicle infotainment 1 and the identification information SID2 of the in-vehicle infotainment 2.

After each of the k in-vehicle infotainments receives the control command, the following operations are executed.

Step 416: An in-vehicle infotainment receives the control command, executes the control command, to obtain execution result information, and sends the execution result information to the server.

For each in-vehicle infotainment, the in-vehicle infotainment is installed on a center console of a vehicle corresponding to the in-vehicle infotainment. The in-vehicle infotainment is connected to an MCU of the vehicle. The in-vehicle infotainment sends the control command to the MCU of the vehicle in which the in-vehicle infotainment is located. The MCU of the vehicle in which the in-vehicle infotainment is located executes the control command, to obtain execution result information, and the MCU sends the execution result information to the in-vehicle infotainment.

Further, after receiving the control command, the in-vehicle infotainment decrypts the control command by using the stored private key, and executes the decrypted control command.

For example, when the control command is a location query command, the in-vehicle infotainment sends the location query command to an MCU of a vehicle in which the in-vehicle infotainment is located. The MCU invokes a GPS module to obtain location information of the vehicle. The location information is the execution result information, and sends the execution result information to the in-vehicle infotainment. When the control command is a status query command, the in-vehicle infotainment sends the status query command to an MCU of a vehicle in which the in-vehicle infotainment is located. The MCU obtains a current status of the vehicle. The current status is the execution result information, and sends the execution result information to the in-vehicle infotainment. When the control command is an engine query command, the in-vehicle infotainment sends the engine query command to an MCU of a vehicle in which the in-vehicle infotainment is located. The MCU obtains a current status of an engine of the vehicle. The current status of the engine is the execution result information, and sends the execution result information to the in-vehicle infotainment.

For another example, for the in-vehicle infotainment 1 and the in-vehicle infotainment 2, the in-vehicle infotainment 1 receives the location query command, obtains a location 1 of a vehicle 1 in which the in-vehicle infotainment 1 is located. The location 1 is the execution result information, and sends the location 1 to the server; and the in-vehicle infotainment 2 receives the location query command, obtains a location 2 of a vehicle 2 in which the in-vehicle infotainment 2 is located. The location 2 is the execution result information, and sends the location 2 to the server.

Step 417: The server receives the execution result information of the k in-vehicle infotainments, and sends the execution result information of the k in-vehicle infotainments to the mobile terminal.

The mobile terminal receives the execution result information, and displays the execution result information to the user.

For example, the server receives the location 1 sent by the in-vehicle infotainment 1 and the location 2 sent by the in-vehicle infotainment 2, and sends the location 1 and the location 2 to the mobile terminal. The mobile terminal receives the location 1 and the location 2 and displays the location 1 and the location 2 to the user.

In this embodiment of the present invention, when a mobile terminal needs to control an in-vehicle infotainment, the mobile terminal logs in to a server. The server sends identification information of m online in-vehicle infotainments to the mobile terminal. The m in-vehicle infotainments are bound to the mobile terminal. The mobile terminal may display the m online in-vehicle infotainments for a user to select. Then, the mobile terminal receives a user operation, determines, according to the user operation, k in-vehicle infotainments that need to be controlled, and sends identification information of the k in-vehicle infotainments and a control command to the server. The server sends the control command to the k in-vehicle infotainments. Therefore, the user may control the k in-vehicle infotainments by using the mobile terminal. In this way, the user may control in-vehicle infotainments of one or more vehicles by using the mobile terminal. When controlling in-vehicle infotainments of multiple vehicles, the user does not need to separately run to and enter each vehicle to control the in-vehicle infotainment of each vehicle. This greatly facilitates use of the in-vehicle infotainment of the user. In addition, the mobile terminal sends the control command to the in-vehicle infotainment by using the server, so that the user can remotely control the in-vehicle infotainment by using the mobile terminal. In this way, even if the user is relatively far away from the vehicle, the user can still immediately control the in-vehicle infotainment of the vehicle by using the mobile terminal. This not only facilitates the use of the in-vehicle infotainment of the user, but also improves real-time performance of controlling the in-vehicle infotainment and satisfies a requirement on the real-time performance of controlling the in-vehicle infotainment by the user. Before sending the control command to the in-vehicle infotainment, the mobile terminal may encrypt the control command by using a public key of the in-vehicle infotainment. After receiving the control command, the in-vehicle infotainment may decrypt the control command by using a private key. This may ensure security of controlling the in-vehicle infotainment by the mobile terminal.

Embodiment 5

Figures 4, 5:
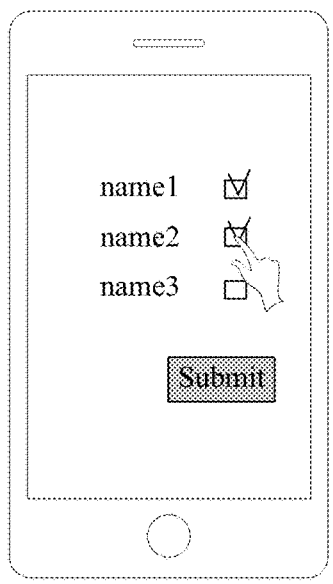

Referring to FIG. 5, FIG. 5 is a schematic structural diagram of a server 500 according to this embodiment of the present invention. The server 500 may differ a lot due to different configurations or different performance, and may include one or more processors 501, a transceiver 502, a memory 532, and one or more storage mediums 530 (for example, one or more massive storage devices) storing an application program 542 or data 544. The memory 532 and the storage medium 530 may be transient storage or persistent storage. The program stored in the storage medium 530 may include one or more modules (not shown in the figure), and each module may operate a series of instructions of the server 500. Furthermore, the processor 501 may be configured to communicate with the storage medium 530, and perform, in the server 500, a series of instruction operations in the storage medium 530.

The server 500 may further include one or more power supplies 526, one or more wired or wireless network interfaces 550, one or more input/output interfaces 558, one or more keyboards 556, and/or one or more operating systems 541 such as Windows Server™, Mac OS X™, Unix™, Linux™, and FreeBSD™.

In the present invention, the processor 501 and the transceiver 502 of the server 500 have the following functions:

The processor 501 is configured to detect login of a mobile terminal.

The transceiver 502 is configured to: send identification information of m online in-vehicle infotainments to the mobile terminal when the processor 501 detects the login of the mobile terminal. The m online in-vehicle infotainments are bound to the mobile terminal, and m is an integer greater than or equal to 1; receive a control command sent by the mobile terminal. The control command is used to control k in-vehicle infotainments to execute an application, the k in-vehicle infotainments are corresponding k in-vehicle infotainments determined by the processor 501 from the identification information of the m in-vehicle infotainments according to a received user operation, k is less than or equal to m, and k is an integer greater than or equal to 1; and send the control command to the k in-vehicle infotainments.

The transceiver 502 may be an RF (radio frequency, radio frequency) circuit.

When the mobile terminal logs in, the mobile terminal sends a login request to the server 500. The login request carries identification information of the mobile terminal and a login password. The transceiver 502 receives the login request. The processor 501 obtains a corresponding login password from a correspondence between identification information and login passwords according to the identification information of the mobile terminal carried in the login request. If the login password carried in the login request is the same as the obtained login password, the mobile terminal is allowed to log in, and it is detected that the mobile terminal logs in to the server 500.

When the login of the mobile terminal is detected, the processor 501 may obtain the identification information of the m online in-vehicle infotainments from a binding relationship list according to the identification information of the mobile terminal, and then the transceiver 502 sends the identification information of the m online in-vehicle infotainments to the mobile terminal.

Optionally, the transceiver 502 is further configured to: receive a binding instruction sent by the mobile terminal. The binding instruction carries the identification information of the mobile terminal and identification information of n in-vehicle infotainments, the binding instruction is used to instruct the server 500 to bind the mobile terminal to the n in-vehicle infotainments, n is greater than or equal to m, and n is an integer greater than or equal to 1; separately send a binding acknowledgment request to the n in-vehicle infotainments according to the identification information of the n in-vehicle infotainments, where the binding acknowledgment requests are used to acknowledge whether the n in-vehicle infotainments are bound to the mobile terminal; and receive binding acknowledgment responses sent by the n in-vehicle infotainments, where the binding acknowledgment responses sent by the n in-vehicle infotainments are responses for acknowledging, according to the binding acknowledgment requests, whether the n in-vehicle infotainments are bound to the mobile terminal.

The processor 501 is further configured to bind the mobile terminal to the m in-vehicle infotainments according to the binding acknowledgment responses sent by the n in-vehicle infotainments. The binding acknowledgment responses sent by the m in-vehicle infotainments are responses for acknowledging that them in-vehicle infotainments are bound to the mobile terminal.

The processor 501 stores a correspondence between the identification information of the mobile terminal and the identification information of the m in-vehicle infotainments in a binding relationship list, to bind the mobile terminal to the m in-vehicle infotainments.

Further, the binding relationship list further stores status information of each of the m in-vehicle infotainments. The status information includes being online or being offline. For each in-vehicle infotainment, when the in-vehicle infotainment starts to be turned on, the in-vehicle infotainment notifies the server 500, and correspondingly, the processor 501 changes the status information of the in-vehicle infotainment into being online in the binding relationship list. When the in-vehicle infotainment starts to be turned off, the in-vehicle infotainment also notifies the server 500, and correspondingly, the processor 501 changes the status information of the in-vehicle infotainment into being offline in the binding relationship list.

Further, the transceiver 502 is further configured to: receive execution result information sent after the k in-vehicle infotainments execute the control command; and send the execution result information of the k in-vehicle infotainments to the mobile terminal.

In this embodiment of the present invention, when the processor of the server detects login of a mobile terminal, the transceiver of the server sends identification information of m online in-vehicle infotainments to the mobile terminal, where the m in-vehicle infotainments are bound to the mobile terminal. Then the mobile terminal determines k in-vehicle infotainments that need to be controlled. Subsequently, the transceiver of the server receives identification information of the k in-vehicle infotainments and a control command that are sent by the mobile terminal, and sends the control command to the k in-vehicle infotainments. Therefore, a user may control the k in-vehicle infotainments by using the mobile terminal. In this way, the user may control in-vehicle infotainments of one or more vehicles by using the mobile terminal. When controlling in-vehicle infotainments of multiple vehicles, the user does not need to separately run to and enter each vehicle to control the in-vehicle infotainment of each vehicle. This greatly facilitates use of the in-vehicle infotainment of the user. In addition, the mobile terminal sends the control command to the in-vehicle infotainment by using the server, so that the user can remotely control the in-vehicle infotainment by using the mobile terminal. In this way, even if the user is relatively far away from the vehicle, the user can still immediately control the in-vehicle infotainment of the vehicle by using the mobile terminal. This not only facilitates the use of the in-vehicle infotainment of the user, but also improves real-time performance of controlling the in-vehicle infotainment and satisfies a requirement on the real-time performance of controlling the in-vehicle infotainment by the user.

Embodiment 6

Figures 4, 5, 6:
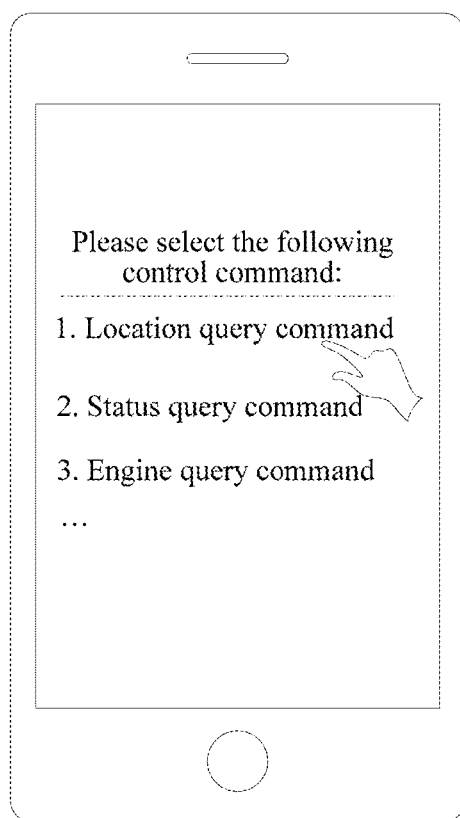
Figure 5:
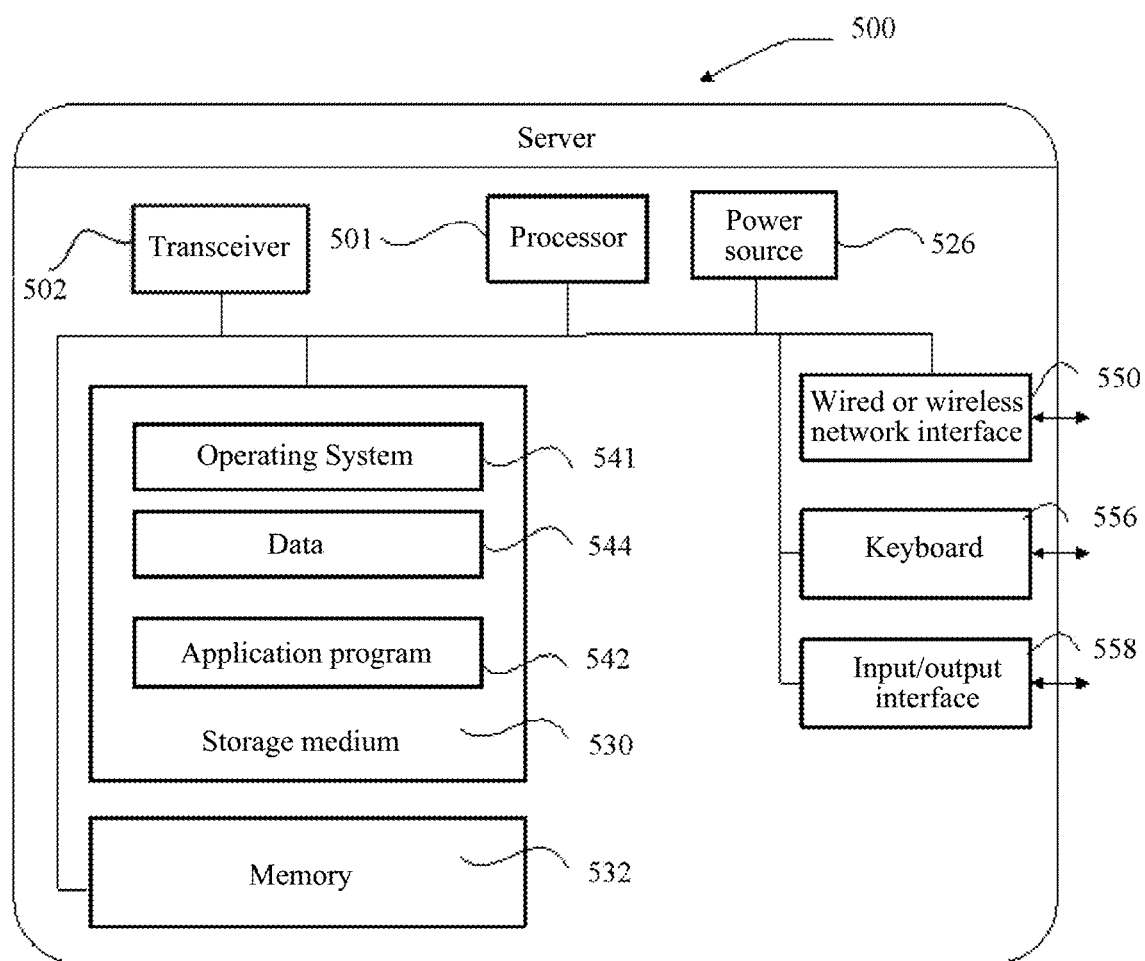
Figure 6:
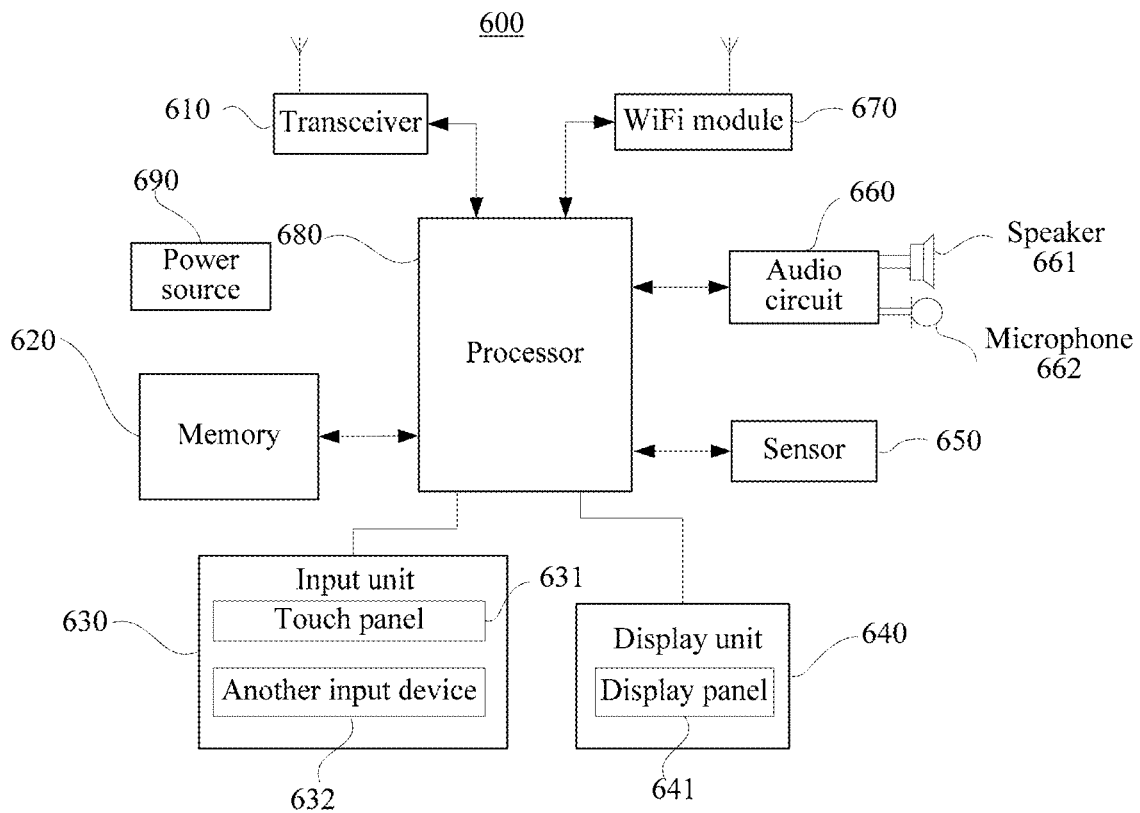

Embodiment 6 of the present invention provides a mobile terminal 600, which may be configured to execute the methods in Embodiments 3 and 4 of the present invention 3. FIG. 6 shows a structure of the mobile terminal 600 provided in Embodiment 6 of the present invention.

The mobile terminal 600 may be a terminal device including a mobile phone, a tablet computer, a PDA (personal digital assistant, personal digital assistant), or the like. Using the mobile terminal 600 being a mobile phone as an example, FIG. 6 shows a block diagram of a part of the structure of a mobile phone 600 related to the terminal provided in this embodiment of the present invention. Referring to FIG. 6, the mobile phone 600 includes components such as a transceiver 610, a memory 620, an input unit 630, a display unit 640, a sensor 650, an audio circuit 660, a WiFi (Wireless Fidelity, Wireless Fidelity) module 670, a processor 680, and a power source 690. A person skilled in the art may understand that the structure of the mobile phone shown in FIG. 6 is only used as an example of implementation manners and does not constitute a limitation on the mobile phone, and the mobile phone may include more components or fewer components than those shown in the figure, or some components may be combined, or a different component deployment may be used.

The components of the mobile phone 600 are specifically described below with reference to FIG. 6.

The transceiver 610 may be an RF circuit and may be configured to: receive and send information, receive and send a signal during a conversation, especially receive, from a base station, downlink information to be processed by the processor 680; and further send designed uplink data to the base station. Usually, the transceiver 610 includes but is not limited to an antenna, at least one amplifier, a transceiver, a coupler, an LNA (low noise amplifier, low-noise amplifier), a duplexer, and the like. In addition, the transceiver 610 may also communicate with a network and another device by means of wireless communication. The wireless communication may use any communications standard or protocol, including but not limited to: GSM (Global System of Mobile communication, Global System for Mobile Communications), GPRS (General Packet Radio Service, General Packet Radio Service), CDMA (Code Division Multiple Access, Code Division Multiple Access), WCDMA (Wideband Code Division Multiple Access, Wideband Code Division Multiple Access), LTE (Long Term Evolution, Long Term Evolution), e-mail, and SMS (short messaging service, short message service).

The memory 620 may be configured to store a software program and a module. The processor 680 runs the software program and the module stored in the memory 620, to implement various functional applications and data processing of the mobile phone 600. The memory 620 may mainly include a program storage area and a data storage area. The program storage area may store an operating system, an application program required by at least one function (such as a sound playback function and an image display function), and the like; and the data storage area may store data (such as audio data and a phone book) created according to use of the mobile phone 600, and the like. In addition, the memory 620 may include a high-speed random access memory, and may further include a non-volatile memory such as at least one disk storage device, a flash memory device, or another volatile solid-state storage device.

The input unit 630 may be configured to: receive input digit or character information, and generate key signal input related to a user setting and function control of the mobile phone 600. Specifically, the input unit 630 may include a touch panel 631 and another input device 632. The touch panel 631, also referred to as a touchscreen, may collect a touch operation of a user on or near the touch panel 631 (such as an operation of a user on the touch panel 631 or near the touch panel 631 by using any suitable object or accessory such as a finger or a stylus), and drive a corresponding connection apparatus according to a preset program. Optionally, the touch panel 631 may include two parts: a touch detection apparatus and a touch controller. The touch detection apparatus detects a touch location of the user, detects a signal generated by the touch operation, and transfers the signal to the touch controller. The touch controller receives touch information from the touch detection apparatus, converts the touch information into touch point coordinates, and then sends the touch point coordinates to the processor 680. Moreover, the touch controller can receive and execute a command sent from the processor 680. In addition, the touch panel 631 may be implemented in various types such as resistance-type, capacitance-type, infrared, and surface acoustic wave. Besides the touch panel 631, the input unit 630 may further include the another input device 632. Specifically, the another input device 632 may include but is not limited to: one or more of a physical keyboard, a functional key (such as a volume control key or a switch key), a trackball, a mouse, or a joystick.

The display unit 640 may be configured to display information entered by the user or information provided for the user, and various menus of the mobile phone 600. The display unit 640 may include a display panel 641. Optionally, the display panel 641 may be configured in a form of an LCD (liquid crystal display, liquid crystal display), an OLED (organic light-emitting diode, organic light-emitting diode), or the like. Further, the touch panel 631 may cover the display panel 641. After detecting a touch operation on or near the touch panel 631, the touch panel 631 transfers the touch operation to the processor 680, so as to determine a type of the touch event. Then, the processor 680 provides a corresponding visual output on the display panel 641 according to the type of the touch event. Although in FIG. 6, the touch panel 631 and the display panel 641 are used as two separate components to implement input and output functions of the mobile phone 600, in some embodiments, the touch panel 631 and the display panel 641 may be integrated to implement the input and output functions of the mobile phone 600.

The mobile phone 600 may further include at least one sensor 650 such as an optical sensor, a motion sensor, and other sensors. Specifically, the optical sensor may include an ambient light sensor and a proximity sensor. The ambient light sensor may adjust luminance of the display panel 641 according to brightness of the ambient light. The proximity sensor may switch off the display panel 641 and/or backlight when the mobile phone 600 is moved to the ear. As one type of motion sensor, an acceleration sensor can detect magnitude of accelerations in various directions (generally on three axes), can detect magnitude and a direction of the gravity when the mobile phone 600 is static, and may be applied to an application that recognizes the gesture of the mobile phone (for example, switching between landscape orientation and portrait orientation, a related game, and magnetometer gesture calibration), a function related to vibration recognition (such as a pedometer and a knock), and the like. As for other sensors such as a gyroscope, a barometer, a hygrometer, a thermometer, and an infrared sensor that may be further configured for the mobile phone 600, details are not described herein.

The audio circuit 660, a speaker 661, and a microphone 662 may provide audio interfaces between the user and the mobile phone 600. The audio circuit 660 may convert received audio data into an electric signal and transmit the electric signal to the speaker 661. The speaker 661 converts the electric signal into a sound signal for output. On the other hand, the microphone 662 converts a collected sound signal into an electric signal. The audio circuit 660 receives the electric signal and converts the electric signal into audio data, and outputs the audio data to the processor 680 for processing. Then, the processor 680 sends the audio data to, for example, another mobile phone by using the RF circuit 610, or outputs the audio data to the memory 620 for further processing.

WiFi belongs to a short distance wireless transmission technology. The mobile phone 600 may help, by using the WiFi module 670, the user receive and send e-mails, browse a webpage, access streaming media, and so on. WiFi provides wireless broadband Internet access for the user. Although FIG. 6 shows the WiFi module 670, it may be understood that the WiFi module 670 is not a necessary component of the mobile phone 600, and the WiFi module 670 may be omitted according to needs as long as the scope of the essence of the present invention is not changed.

The processor 680 is a control center of the mobile phone 600, and is connected to various parts of the whole mobile phone by using various interfaces and lines. By running or executing the software program and/or the module stored in the memory 620, and invoking the data stored in the memory 620, the processor 680 performs various functions and data processing of the mobile phone 600, thereby performing overall monitoring on the mobile phone. Optionally, the processor 680 may include one or more processing units. Preferably, the processor 680 may integrate an application processor and a modem processor. The application processor mainly processes an operating system, a user interface, an application program, and the like. The modem processor mainly processes wireless communication. It may be understood that the foregoing modem processor may not be integrated into the processor 680.

The mobile phone 600 further includes the power source 690 (such as a battery) for supplying power to the components. Preferably, the power source may be logically connected to the processor 680 by using a power management system, thereby implementing functions such as charging, discharging and power consumption management by using the power management system.

Although not shown in the figure, the mobile phone 600 may further include a camera, a Bluetooth module, and the like, and details are not described herein.

In this embodiment of the present invention, the processor 680 and the transceiver 610 that are included in the mobile terminal 600 have the following functions:

The processor 680 is configured to log in to a server.

The transceiver 610 is configured to: receive identification information of m in-vehicle infotainments that is sent by the server after the server is logged in to, where the m in-vehicle infotainments are bound to the mobile terminal 600, and m is an integer greater than or equal to 1; and receive a user operation, where the user operation is used to determine corresponding k in-vehicle infotainments from the identification information of the m in-vehicle infotainments.

Optionally, the transceiver 610 is configured to send a binding instruction to the server. The binding instruction carries identification information of the mobile terminal 600 and identification information of n in-vehicle infotainments, the binding instruction is used to instruct the server to bind the mobile terminal 600 to the n in-vehicle infotainments, n is greater than or equal to m, and n is an integer greater than or equal to 1.

Optionally, the transceiver 610 is further configured to receive a binding completion notification sent by the server. The binding completion notification is sent after the server binds the mobile terminal to the m in-vehicle infotainments.

Optionally, the transceiver 610 is further configured to receive execution result information that is sent by the server and that is sent after the k in-vehicle infotainments execute a control command.

In this embodiment of the present invention, after the processor of the mobile terminal logs in to the server, the transceiver of the mobile terminal receives identification information of m online in-vehicle infotainments that is sent by the server. The m in-vehicle infotainments are bound to the mobile terminal, and receives a user operation. Then, the processor determines k in-vehicle infotainments from the identification information of the m in-vehicle infotainments according to the user operation. The transceiver sends identification information of the k in-vehicle infotainments and a control command to the server. After the processor determines the k in-vehicle infotainments, a user may send the control command to the k in-vehicle infotainments by using the transceiver of the mobile terminal. In this way, the user may control in-vehicle infotainments of one or more vehicles by using the mobile terminal. When controlling in-vehicle infotainments of multiple vehicles, the user does not need to separately run to and enter each vehicle to control the in-vehicle infotainment of each vehicle. This greatly facilitates use of the in-vehicle infotainment of the user. In addition, the in-vehicle infotainment is remotely controlled by using the mobile terminal. In this way, even if the user is relatively far away from the vehicle, the user can still immediately control the in-vehicle infotainment of the vehicle by using the mobile terminal. This not only facilitates the use of the in-vehicle infotainment of the user, but also improves real-time performance of controlling the in-vehicle infotainment and satisfies a requirement on the real-time performance of controlling the in-vehicle infotainment by the user.

Embodiment 7

Figure 7:
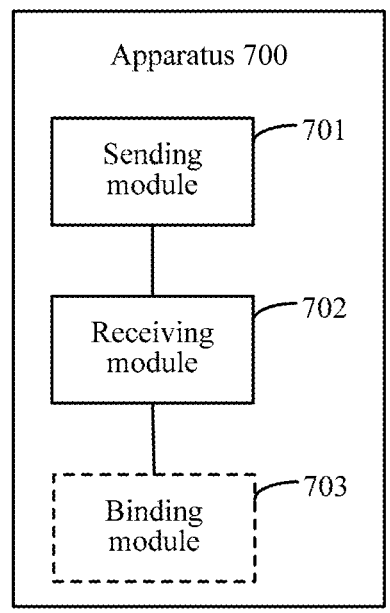
FIG. 7 is a schematic structural diagram of an apparatus for exchanging data with an in-vehicle infotainment according to an embodiment of the present invention.

Referring to FIG. 7, this embodiment of the present invention provides an apparatus 700 for exchanging data with an in-vehicle infotainment, including:

a sending module 701, configured to send identification information of m online in-vehicle infotainments to a mobile terminal when login of the mobile terminal is detected, where the m online in-vehicle infotainments are bound to the mobile terminal, and m is an integer greater than or equal to 1; and a receiving module 702, configured to receive a control command sent by the mobile terminal, where the control command is used to control k in-vehicle infotainments to execute an application, the k in-vehicle infotainments are corresponding k in-vehicle infotainments determined by the mobile terminal from the identification information of the m in-vehicle infotainments according to a received user operation, k is less than or equal to m, and k is an integer greater than or equal to 1, where the sending module 701 is further configured to send the control command to the k in-vehicle infotainments.

When the mobile terminal logs in, the mobile terminal sends a login request to the apparatus 700, where the login request carries identification information of the mobile terminal and a login password. The apparatus 700 receives the login request, obtains a corresponding login password from a correspondence between identification information and login passwords according to the identification information of the mobile terminal carried in the login request. If the login password carried in the login request is the same as the obtained login password, the mobile terminal is allowed to log in, and it is detected that the mobile terminal logs in to the apparatus 700.

When the login of the mobile terminal is detected, the apparatus 700 may obtain the identification information of the m online in-vehicle infotainments from a binding relationship list according to the identification information of the mobile terminal, and then sends the identification information of the m online in-vehicle infotainments to the mobile terminal by using the sending module 701.

Further, the apparatus 700 further includes a binding module 703.

The receiving module 702 is further configured to receive a binding instruction sent by the mobile terminal, where the binding instruction carries the identification information of the mobile terminal and identification information of n in-vehicle infotainments, the binding instruction is used to instruct the apparatus 700 to bind the mobile terminal to the n in-vehicle infotainments, n is greater than or equal to m, and n is an integer greater than or equal to 1.

The sending module 701 is further configured to separately send a binding acknowledgment request to the n in-vehicle infotainments according to the identification information of the n in-vehicle infotainments, where the binding acknowledgment requests are used to acknowledge whether the n in-vehicle infotainments are bound to the mobile terminal.

The receiving module 702 is further configured to receive binding acknowledgment responses sent by the n in-vehicle infotainments, where the binding acknowledgment responses sent by the n in-vehicle infotainments are responses for acknowledging, according to the binding acknowledgment requests, whether the n in-vehicle infotainments are bound to the mobile terminal.

The binding module 703 is configured to bind the mobile terminal to the m in-vehicle infotainments according to the binding acknowledgment responses sent by the n in-vehicle infotainments, where the binding acknowledgment responses sent by the m in-vehicle infotainments are responses for acknowledging that the m in-vehicle infotainments are bound to the mobile terminal.

The binding module 703 stores a correspondence between the identification information of the mobile terminal and the identification information of the m in-vehicle infotainments in a binding relationship list, to bind the mobile terminal to the m in-vehicle infotainments.

Further, the binding relationship list further stores status information of each of the m in-vehicle infotainments, where the status information includes being online or being offline. For each in-vehicle infotainment, when the in-vehicle infotainment starts to be turned on, the in-vehicle infotainment notifies the apparatus 700, and correspondingly, the apparatus 700 changes the status information of the in-vehicle infotainment into being online in the binding relationship list. When the in-vehicle infotainment starts to be turned off, the in-vehicle infotainment also notifies the apparatus 700, and correspondingly, the apparatus 700 changes the status information of the in-vehicle infotainment into being offline in the binding relationship list.

Further, the receiving module 702 is further configured to receive execution result information sent after the k in-vehicle infotainments execute the control command.

The sending module 701 is further configured to send the execution result information of the k in-vehicle infotainments to the mobile terminal.

In this embodiment of the present invention, when the apparatus 700 detects login of a mobile terminal, the sending module of the apparatus 700 sends identification information of m online in-vehicle infotainments to the mobile terminal, where the m in-vehicle infotainments are bound to the mobile terminal. Then the mobile terminal determines k in-vehicle infotainments that need to be controlled. Subsequently, the receiving module of the apparatus 700 receives identification information of the k in-vehicle infotainments and a control command that are sent by the mobile terminal, and then sends the control command to the k in-vehicle infotainments by using the sending module. Therefore, a user may control the k in-vehicle infotainments by using the mobile terminal. In this way, the user may control in-vehicle infotainments of one or more vehicles by using the mobile terminal. When controlling in-vehicle infotainments of multiple vehicles, the user does not need to separately run to and enter each vehicle to control the in-vehicle infotainment of each vehicle. This greatly facilitates use of the in-vehicle infotainment of the user. In addition, the mobile terminal sends the control command to the in-vehicle infotainment by using the apparatus 700, so that the user can remotely control the in-vehicle infotainment by using the mobile terminal. In this way, even if the user is relatively far away from the vehicle, the user can still immediately control the in-vehicle infotainment of the vehicle by using the mobile terminal. This not only facilitates the use of the in-vehicle infotainment of the user, but also improves real-time performance of controlling the in-vehicle infotainment and satisfies a requirement on the real-time performance of controlling the in-vehicle infotainment by the user.

Embodiment 8

Figure 8:
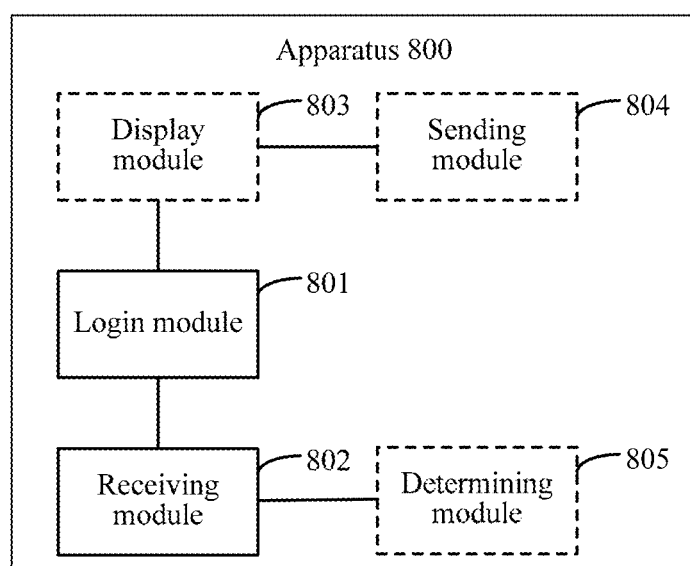
FIG. 8 is a schematic structural diagram of an apparatus for exchanging data with an in-vehicle infotainment according to another embodiment of the present invention.

Referring to FIG. 8, this embodiment of the present invention provides an apparatus 800 for exchanging data with an in-vehicle infotainment, including:

a login module 801, configured to log in to a server; and a receiving module 802, configured to: receive identification information of m in-vehicle infotainments that is sent by the server after the server is logged in to, where the m in-vehicle infotainments are bound to the apparatus 800, and m is an integer greater than or equal to 1; and receive a user operation, where the user operation is used to determine corresponding k in-vehicle infotainments from the identification information of the m in-vehicle infotainments.

The apparatus 800 further includes a display module 803 and a sending module 804. Correspondingly, the login module 801 may log in to the server in the following manners, which are specifically:

The login module 801 triggers the display module 803 to display a login interface. A user enters identification information of the apparatus 800 and a login password into the login interface. The login module 801 obtains the identification information and the login password from the login interface. The sending module 804 sends a login request to the server, where the login request carries the identification information and the login password. The server receives the login request, and finds a corresponding login password according to the identification information carried in the login request from a correspondence that is between identification information and login passwords and that is stored in the server. If the found login password is the same as the login password carried in the login request, the binding module 801 is allowed to log in.

Further, the apparatus 800 may further include a determining module 805. After the receiving module 802 receives the identification information of the m in-vehicle infotainments, the display module 803 displays in-vehicle infotainment names corresponding to the identification information of the m in-vehicle infotainments. The user selects, from the displayed in-vehicle infotainment names of the m in-vehicle infotainments, in-vehicle infotainment names of the k in-vehicle infotainments that need to be controlled. The receiving module 802 receives the user operation, and the determining module 805 determines the kin-vehicle infotainments from the identification information of the m in-vehicle infotainments according to the user operation.

Further, before the identification information of the m in-vehicle infotainments is received, the sending module 804 is configured to send a binding instruction to the server, where the binding instruction carries the identification information of the apparatus 800 and identification information of n in-vehicle infotainments, the binding instruction is used to instruct the server to bind the apparatus 800 to the n in-vehicle infotainments, n is greater than or equal to m, and n is an integer greater than or equal to 1.

Optionally, the receiving module 802 is further configured to receive a binding completion notification sent by the server, where the binding completion notification is sent after the server binds the apparatus 800 to the m in-vehicle infotainments.

Optionally, the receiving module 802 is further configured to receive execution result information that is sent by the server and that is sent after the k in-vehicle infotainments execute a control command.

In this embodiment of the present invention, the receiving module receives identification information of m online in-vehicle infotainments that is sent by a server after the login module logs in to the server, where the m in-vehicle infotainments are bound to the apparatus 800, receives a user operation, and then determines corresponding k in-vehicle infotainments from the identification information of the m in-vehicle infotainments according to the user operation. The sending module sends identification information of the k in-vehicle infotainments and a control command to the server. The server separately sends the control command to the k in-vehicle infotainments according to the identification information of the k in-vehicle infotainments. The k in-vehicle infotainments separately execute the control command. In this way, a user may control in-vehicle infotainments of one or more vehicles by using the apparatus 800. When controlling in-vehicle infotainments of multiple vehicles, the user does not need to separately run to and enter each vehicle to control the in-vehicle infotainment of each vehicle. This greatly facilitates use of the in-vehicle infotainment of the user. In addition, the in-vehicle infotainment is remotely controlled by using the apparatus 800. In this way, even if the user is relatively far away from the vehicle, the user can still immediately control the in-vehicle infotainment of the vehicle by using the apparatus 800. This not only facilitates the use of the in-vehicle infotainment of the user, but also improves real-time performance of controlling the in-vehicle infotainment and satisfies a requirement on the real-time performance of controlling the in-vehicle infotainment by the user.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A method, comprising:
    receiving, by a server, a binding instruction sent by a mobile terminal carrying identification information of the mobile terminal and identification information of n in-vehicle infotainments for instructing the server to bind the mobile terminal to the n in-vehicle infotainments, and n is an integer greater than or equal to 1;
    separately sending, by the server, a binding acknowledgment request to the n in-vehicle infotainments according to the identification information of the n in-vehicle infotainments;
    receiving, by the server, binding acknowledgment responses sent by the n in-vehicle infotainments for acknowledging, according to the binding acknowledgment requests, whether the n in-vehicle infotainments are bound to the mobile terminal; and
    binding, by the server, the mobile terminal to m online in-vehicle infotainments according to the binding acknowledgment responses sent by the n in-vehicle infotainments, wherein the binding acknowledgment responses sent by the m online in-vehicle infotainments are responses for acknowledging that the m online in-vehicle infotainments are bound to the mobile terminal, wherein the m online in-vehicle infotainments are installed as integrated vehicle equipment, wherein n is greater than or equal to m, and wherein m is an integer greater than or equal to 1;
    sending, by the server, after the binding the mobile terminal to m online in-vehicle infotainments, identification information of the m in-vehicle infotainments to mobile terminal when login of the mobile terminal is detected, wherein the m online in-vehicle infotainments are bound to the mobile terminal;
    receiving, by the server, a control instruction sent by the mobile terminal, wherein the control instruction instructs k in-vehicle infotainments to execute an application, wherein the k in-vehicle infotainments are determined by the mobile terminal based on the identification information of them online in-vehicle infotainments according to a received user operation, k is less than or equal to m, and k is an integer greater than or equal to 1; and
    after receiving the control instruction, sending, by the server, the control instruction to the k in-vehicle infotainments.

2. The method according to claim 1, wherein after sending the control instruction to the k in-vehicle infotainments, the method further comprises:
    receiving, by the server, execution result information sent after the k in-vehicle infotainments execute the control instruction; and
    sending, by the server, the execution result information to the mobile terminal.

3. A server, comprising:
    a processor configured to detect login of a mobile terminal; and
    a transceiver configured to:
        receive a binding instruction sent by the mobile terminal and carrying identification information of the mobile terminal and identification information of n in-vehicle infotainments for instructing the server to bind the mobile terminal to the n in-vehicle infotainments, and n is an integer greater than or equal to 1,
        separately send a binding acknowledgment request to the n in-vehicle infotainments according to the identification information of the n in-vehicle infotainments, and
        receive binding acknowledgment responses sent by the n in-vehicle infotainments for acknowledging, according to the binding acknowledgment requests, whether the n in-vehicle infotainments are bound to the mobile terminal;
    wherein the processor is further configured to bind the mobile terminal to m online in-vehicle infotainments according to the binding acknowledgment responses sent by the n in-vehicle infotainments, wherein the binding acknowledgment responses sent by the m online in-vehicle infotainments are responses for acknowledging that the m online in-vehicle infotainments are bound to the mobile terminal, wherein the m online in-vehicle infotainments are installed as integrated vehicle equipment, wherein n is greater than or equal to m, and wherein m is an integer greater than or equal to 1; and
    wherein the transceiver is further configured to, after the processor binds the mobile terminal to the m online in-vehicle infotainments:
        send identification information of the m online in-vehicle infotainments to the mobile terminal in response to the processor detecting the login of the mobile terminal, wherein the m online in-vehicle infotainments are bound to the mobile terminal,
        receive a control instruction sent by the mobile terminal, wherein the control instruction instructs k in-vehicle infotainments to execute an application, wherein the k in-vehicle infotainments are determined by the mobile terminal based on the identification information of the m online in-vehicle infotainments according to a received user operation, k is less than or equal to m, and k is an integer greater than or equal to 1, and
        after receiving the control instruction, send the control instruction to the k in-vehicle infotainments.

4. The server according to claim 3, wherein the transceiver is further configured to:

receive execution result information sent after the k in-vehicle infotainments execute the control instruction; and send the execution result information to the mobile terminal.

5. A non-transitory computer-readable storage medium comprising instructions which, when executed by a computer, cause the computer to:

receive a binding instruction sent by a mobile terminal carrying identification information of the mobile terminal and identification information of n in-vehicle infotainments for instructing a server to bind the mobile terminal to the n in-vehicle infotainments, wherein n is an integer greater than or equal to 1;

separately send a binding acknowledgment request to the n in-vehicle infotainments according to the identification information of the n in-vehicle infotainments;

receive binding acknowledgment responses sent by the n in-vehicle infotainments for acknowledging, according to the binding acknowledgment requests, whether the n in-vehicle infotainments are bound to the mobile terminal; and bind the mobile terminal to m online in-vehicle infotainments according to the binding acknowledgment responses sent by the n in-vehicle infotainments, wherein the binding acknowledgment responses sent by the m online in-vehicle infotainments are responses for acknowledging that the m online in-vehicle infotainments are bound to the mobile terminal, wherein the m online in-vehicle infotainments are installed as integrated vehicle equipment, wherein n is greater than or equal to m, and wherein m is an integer greater than or equal to 1;

send, by the server, identification information of the m online in-vehicle infotainments to the mobile terminal in response to a login of the mobile terminal being detected and after the mobile terminal is bound to the m online in-vehicle infotainments, wherein the m online in-vehicle infotainments are bound to the mobile terminal;

receive, by the server, a control instruction sent by the mobile terminal, wherein the control instruction instructs k in-vehicle infotainments to execute an application, wherein the k in-vehicle infotainments are determined by the mobile terminal based on the identification information of the m online in-vehicle infotainments according to a received user operation, k is less than or equal to m, and k is an integer greater than or equal to 1; and send, by the server, the control instruction to the k in-vehicle infotainments after receiving the control instruction.

6. The non-transitory computer-readable storage medium according to claim 5, wherein after the control instruction to the k in-vehicle infotainments is sent, the instructions, when executed by the computer, further cause the computer to:

receive execution result information sent after the k in-vehicle infotainments execute the control instruction; and send the execution result information to the mobile terminal.

7. A method for exchanging data with an in-vehicle infotainment, wherein the method is applied to a server, the method comprising:

before sending identification information of m online in-vehicle infotainments to a mobile terminal when login of the mobile terminal is detected:

receiving a binding instruction sent by the mobile terminal carrying identification information of the mobile terminal and identification information of n in-vehicle infotainments for instructing the server to bind the mobile terminal to the n in-vehicle infotainments, n is greater than or equal to m, and n is an integer greater than or equal to 1, separately sending a binding acknowledgment request to the n in-vehicle infotainments according to the identification information of the n in-vehicle infotainments, receiving binding acknowledgment responses sent by the n in-vehicle infotainments for acknowledging, according to the binding acknowledgment requests, whether the n in-vehicle infotainments are bound to the mobile terminal, and binding the mobile terminal to the m in-vehicle infotainments according to the binding acknowledgment responses sent by the n in-vehicle infotainments, wherein the binding acknowledgment responses sent by the m in-vehicle infotainments are responses for acknowledging that the m in-vehicle infotainments are bound to the mobile terminal;

sending the identification information of the m online in-vehicle infotainments to the mobile terminal when the login of the mobile terminal is detected, wherein the m online in-vehicle infotainments are bound to the mobile terminal, and m is an integer greater than or equal to 1;

receiving control instruction sent by the mobile terminal, wherein the control instruction instructs k in-vehicle infotainments to execute an application, wherein the k in-vehicle infotainments are determined by the mobile terminal from the identification information of the m in-vehicle infotainments according to a received user operation, k is less than or equal to m, and k is an integer greater than or equal to 1; and sending the control instruction to the k in-vehicle infotainments.

8. A server, comprising:

a processor configured to detect login of a mobile terminal; and a transceiver configured to:

receive a binding instruction sent by the mobile terminal carrying identification information of the mobile terminal and identification information of n in-vehicle infotainments for instructing the server to bind the mobile terminal to the n in-vehicle infotainments, n is greater than or equal to m, and n is an integer greater than or equal to 1, separately send a binding acknowledgment request to the n in-vehicle infotainments according to the identification information of the n in-vehicle infotainments, receive binding acknowledgment responses sent by the n in-vehicle infotainments for acknowledging, according to the binding acknowledgment requests, whether the n in-vehicle infotainments are bound to the mobile terminal, send identification information of m online in-vehicle infotainments to the mobile terminal when the processor detects the login of the mobile terminal, wherein the m online in-vehicle infotainments are bound to the mobile terminal, and m is an integer greater than or equal to 1, receive a control instruction sent by the mobile terminal, wherein the control instruction instructs k in-vehicle infotainments to execute an application, wherein the k in-vehicle infotainments are determined by the mobile terminal from the identification information of the m in-vehicle infotainments according to a received user operation, k is less than or equal to m, and k is an integer greater than or equal to 1, and send the control instruction to the k in-vehicle infotainments;

wherein the processor is further configured to bind the mobile terminal to the m in-vehicle infotainments according to the binding acknowledgment responses sent by the n in-vehicle infotainments, wherein the binding acknowledgment responses sent by the m in-vehicle infotainments are responses for acknowledging that the m in-vehicle infotainments are bound to the mobile terminal.

9. A non-transitory computer-readable storage medium comprising instructions which, when executed by a computer, cause the computer to:

before identification information of m online in-vehicle infotainments is sent to a mobile terminal when login of the mobile terminal is detected:

receive a binding instruction sent by the mobile terminal carrying identification information of the mobile terminal and identification information of n in-vehicle infotainments for instructing a server to bind the mobile terminal to the n in-vehicle infotainments, n is greater than or equal to m, and n is an integer greater than or equal to 1, separately send a binding acknowledgment request to the n in-vehicle infotainments according to the identification information of the n in-vehicle infotainments, receive binding acknowledgment responses sent by the n in-vehicle infotainments for acknowledging, according to the binding acknowledgment requests, whether the n in-vehicle infotainments are bound to the mobile terminal, and bind the mobile terminal to the m in-vehicle infotainments according to the binding acknowledgment responses sent by the n in-vehicle infotainments, wherein the binding acknowledgment responses sent by the m in-vehicle infotainments are responses for acknowledging that the m in-vehicle infotainments are bound to the mobile terminal;

send the identification information of the m online in-vehicle infotainments to the mobile terminal when the login of the mobile terminal is detected, wherein the m online in-vehicle infotainments are bound to the mobile terminal, and m is an integer greater than or equal to 1;

receive a control instruction sent by the mobile terminal, wherein the control instruction instructs k in-vehicle infotainments to execute an application, wherein the k in-vehicle infotainments are determined by the mobile terminal from the identification information of the m in-vehicle infotainments according to a received user operation, k is less than or equal to m, and k is an integer greater than or equal to 1; and sending the control instruction to the k in-vehicle infotainments.

* * * * *